(12) United States Patent
Fujita et al.

(10) Patent No.: US 9,989,121 B2
(45) Date of Patent: Jun. 5, 2018

(54) ROTATING MOVEMENT CONTROL MECHANISM AND SEAT

(71) Applicant: DELTA TOOLING CO., LTD., Hiroshima-shi (JP)

(72) Inventors: Etsunori Fujita, Higashihiroshima (JP); Katsuhiro Inoue, Hiroshima (JP); Hiroki Nawamoto, Hiroshima (JP)

(73) Assignee: DELTA TOOLING CO., LTD., Hiroshima-shi (JP)

( * ) Notice: Subject to any disclaimer, the term of this patent is extended or adjusted under 35 U.S.C. 154(b) by 70 days.

(21) Appl. No.: 14/902,768

(22) PCT Filed: May 12, 2014

(86) PCT No.: PCT/JP2014/062645
§ 371 (c)(1),
(2) Date: Jan. 4, 2016

(87) PCT Pub. No.: WO2015/001846
PCT Pub. Date: Jan. 8, 2015

(65) Prior Publication Data
US 2016/0169327 A1    Jun. 16, 2016

(30) Foreign Application Priority Data

Jul. 4, 2013 (JP) ................................ 2013-140266

(51) Int. Cl.
*B60N 2/22* (2006.01)
*F16H 1/20* (2006.01)
(Continued)

(52) U.S. Cl.
CPC ........... *F16H 1/203* (2013.01); *B60N 2/2227* (2013.01); *B60N 2/2231* (2013.01); *B60N 2/433* (2013.01);
(Continued)

(58) Field of Classification Search
None
See application file for complete search history.

(56) References Cited

U.S. PATENT DOCUMENTS

| 4,335,919 A * | 6/1982 | Nagashima | .......... B60N 2/0232 248/429 |
| 4,402,547 A * | 9/1983 | Weston | ................ B60N 2/0232 292/DIG. 22 |

(Continued)

FOREIGN PATENT DOCUMENTS

| DE | 44 22 529 A1 | 5/1995 |
| JP | 61-101493 U | 6/1986 |

(Continued)

OTHER PUBLICATIONS

International Search Report dated Aug. 5, 2014 for PCT/JP2014/062645 filed on May 12, 2014.

*Primary Examiner* — Joshua J Michener
*Assistant Examiner* — Kyle J. Walraed-Sullivan
(74) *Attorney, Agent, or Firm* — Oblon, McClelland, Maier & Neustadt, L.L.P.

(57) ABSTRACT

A rotating movement control mechanism including a worm, and a main driving side worm wheel and a driven side worm wheel disposed across the worm. Both end portions of the worm in an axial direction are axially supported by bearing parts. Respective teeth of the main driving side worm wheel and the driven side worm wheel contact both sides of the worm in a direction substantially orthogonal to the axial center with a backlash, and are supported thereby. When the second member is relatively rotated with respect to the first member, the worm rotates relatively with respect to the main driving side worm wheel. The driven side worm wheel rotates by a rotational force of the worm, and a rotational force of the driven side worm wheel is regenerated in the (Continued)

worm. Whirling vibrations of the worm are suppressed, and relative rotation is performed smoothly.

12 Claims, 26 Drawing Sheets

(51) Int. Cl.
  *B60N 2/433* (2006.01)
  *F16H 57/00* (2012.01)
  *F16H 57/12* (2006.01)
(52) U.S. Cl.
  CPC ......... *B60N 2/938* (2018.02); *F16H 57/0006* (2013.01); *F16H 57/12* (2013.01); *B60N 2205/20* (2013.01)

(56) References Cited

U.S. PATENT DOCUMENTS

| | | | | |
|---|---|---|---|---|
| 4,521,055 A * | 6/1985 | Fudala | .................. | B60N 2/0232 297/330 |
| 4,685,735 A * | 8/1987 | McFalls | ............... | B60N 2/2231 297/361.1 |
| 4,929,024 A * | 5/1990 | Secord | .................. | B60N 2/2231 297/362 |
| 4,986,514 A * | 1/1991 | Ikegaya | ............... | B60N 2/2213 297/330 |
| 5,005,906 A * | 4/1991 | Suzuki | .................. | B60N 2/2213 297/362 |
| 5,123,703 A * | 6/1992 | Morris | .................. | B60N 2/2231 29/524.1 |
| 5,212,868 A * | 5/1993 | Morris | .................. | B60N 2/2231 29/437 |
| 5,248,184 A * | 9/1993 | Morris | .................... | B60N 2/20 297/362 |
| 5,435,624 A * | 7/1995 | Bray | .................... | B60N 2/0232 297/362 |
| 5,590,562 A * | 1/1997 | Scheck | ................ | B60N 2/4435 74/411.5 |
| 5,702,155 A * | 12/1997 | Ito | ......................... | B60N 2/2213 297/362 |
| 5,997,089 A * | 12/1999 | Kawasaki | ................ | B60N 2/34 297/362.12 |
| 6,428,104 B1 * | 8/2002 | Sakamoto | ............ | B60N 2/2231 297/362.11 |
| 6,543,850 B1 * | 4/2003 | Becker | ................. | B60N 2/0232 297/362 |
| 6,722,739 B2 * | 4/2004 | Klein | .................... | B60N 2/2352 297/367 R |
| 9,499,071 B2 * | 11/2016 | Karthaus | ............... | B60N 2/0232 |
| 2002/0011748 A1 * | 1/2002 | Ito | ......................... | B60N 2/0232 297/362 |
| 2003/0042780 A1 * | 3/2003 | Klein | ....................... | B60N 2/20 297/367 R |
| 2003/0160489 A1 * | 8/2003 | Sakamoto | ............ | B60N 2/2231 297/354.12 |
| 2004/0135415 A1 * | 7/2004 | Sakamoto | ............ | B60N 2/2231 297/361.1 |
| 2005/0221957 A1 * | 10/2005 | Sheng | .................. | B60N 2/0232 477/162 |
| 2006/0006717 A1 * | 1/2006 | Sakamoto | ............... | B60N 2/433 297/361.1 |
| 2007/0273193 A1 * | 11/2007 | Ichikawa | ............... | B60N 2/071 297/344.12 |
| 2008/0164741 A1 * | 7/2008 | Sakamoto | ............ | B60N 2/2227 297/362 |
| 2009/0021066 A1 * | 1/2009 | Nathan | ................ | B60N 2/2231 297/362 |
| 2009/0146478 A1 * | 6/2009 | Sakamoto | ............ | B60N 2/2231 297/362.14 |
| 2009/0243327 A1 * | 10/2009 | Koga | .................... | B60N 2/067 296/65.15 |
| 2009/0278392 A1 * | 11/2009 | Ito | ......................... | B60N 2/0232 297/354.1 |
| 2010/0060061 A1 * | 3/2010 | Koga | .................. | B60N 2/0232 297/344.1 |
| 2010/0201174 A1 * | 8/2010 | Ito | ......................... | B60N 2/0232 297/362 |
| 2011/0043017 A1 * | 2/2011 | Kokubo | ............... | B60N 2/0232 297/337 |
| 2011/0043024 A1 * | 2/2011 | Kokubo | ............... | B60N 2/0232 297/378.1 |
| 2011/0121624 A1 * | 5/2011 | Brncick | ............... | B60N 2/0232 297/284.2 |
| 2012/0104817 A1 * | 5/2012 | Jungert | .................... | B60N 2/02 297/313 |
| 2014/0203610 A1 * | 7/2014 | Line | ..................... | B60N 2/2222 297/354.1 |
| 2014/0238188 A1 * | 8/2014 | Ito | ......................... | B60N 2/0228 74/664 |
| 2016/0297330 A1 * | 10/2016 | Linnenbrink | ........ | B60N 2/2231 |

FOREIGN PATENT DOCUMENTS

| | | |
|---|---|---|
| JP | 2003-319849 A | 11/2003 |
| JP | 2006-247241 A | 9/2006 |
| JP | 2007-130455 A | 5/2007 |

* cited by examiner

ROTATING MOVEMENT CONTROL MECHANISM AND SEAT

TECHNICAL FIELD

The present invention relates to a rotating movement control mechanism for allowing rotation between relatively rotating members or locking them at an arbitrary angle, and particularly relates to a rotating movement control mechanism attached to a seat of a vehicle or the like and located between mutually turning frames among a plurality of frames constituting the seat, for example, a rotating movement control mechanism suitable for use as a reclining adjuster for appropriately adjusting an inclination angle of a seat back with respect to a seat cushion, or a rotation operating unit of a front-rear lifter or a parallel lifter, or a substitute for a lock mechanism of a power unit motor or the like. Further, the present invention relates to a seat in which such a rotating movement control mechanism is incorporated.

BACKGROUND ART

Patent Document 1 and Patent Document 2 respectively disclose a technology using a slide member which contacts a tooth surface of a worm for stopping rotation of the worm by friction and a technology allowing a worm itself to move in parallel toward a worm wheel and stopping rotation of a worm by friction by pressing the worm against the worm wheel, as a lock mechanism when a seat back is stopped at a predetermined inclination angle. In this structure, a large pressing force is needed for obtaining a necessary lock force.

Between respective teeth of the worm and the worm wheel, a backlash exists for smooth rotating movement, but the backlash is a main cause for rattling or abnormal noise when the seat back is locked.

However, for smooth rotating movement of the worm and the worm wheel, bearings which axially supporting both end portions in an axial direction of the worm have to be strictly positioned to adjust the size of the backlash based on a constant meshing relation. Further, the backlash also varies owing to manufacturing errors of the worm and so on, wear or deformation of teeth due to use, and the like, and thus it is difficult to have a small dispersion per product. Further, even if the worm is pressed against the worm wheel when the seat back is locked, a clearance formed remains between the respective teeth of the worm and the worm wheel along a thrust direction of the worm, and this clearance may cause rattling or abnormal sound when the seat back is locked.

On the other hand, the present applicant has proposed the following mechanisms in Patent Document 3 and Patent Document 4 as a mechanism which can even eliminate the clearance in the thrust direction of the worm when the seat back is locked.

Specifically, Patent Document 3 proposes a reclining adjuster using a worm in which a recessed portion is formed on both end faces, and employing a support structure for the worm in which bearings provided with a recessed portion in faces opposing the worm are fixed to a bracket, and balls are loaded between the worm and the bearings, wherein a tooth part on another end side in an axial direction of the worm is pressed against the worm wheel by a pressing means to lock when the seat back is stopped at a predetermined inclination angle. Further, in order to make a movable range of the worm larger than in the technology of Patent Document 3, Patent Document 4 proposes a mechanism in which a vertically moving movable bearing is provided on the other end side in the axial direction of the worm, and the movable bearing is moved up or down to press the worm against the worm wheel.

PRIOR ART DOCUMENT

Patent Document

Patent Document 1: German Patent Publication DE 4422529 A1
Patent Document 2: U.S. Pat. No. 5,590,562
Patent Document 3: Japanese Patent Application Laid-open No. 2003-319849
Patent Document 4: Japanese Patent Application Laid-open No. 2007-130455

DISCLOSURE OF THE INVENTION

Problems to be Solved by the Invention

In the mechanism of Patent Documents 3, 4, when the seat back is locked, with one end side in an axial direction of the worm being a center, the other end side in the axial direction rotates toward the worm wheel side, and the worm is pressed against the worm wheel with an axial center of the worm being inclined. As a result, a force in one end direction in the axial direction operates by the balls to the other end side in the axial direction in the worm, and this worm is also displaced in this thrust direction. Accordingly, not only the backlash can be eliminated, but also the clearance in the thrust direction of the worm can be eliminated, so as to suppress rattling or abnormal noise in the seat back mainly caused by this clearance. Further, Patent Document 4 has a structure provided with a latch member engaging with an engagement trench ditched in the surface of a tooth on the other end side in the axial direction of the worm, and this latch member engages with the engagement trench so as to assure locking.

However, in the technologies disclosed in Patent Documents 1 to 4, the worm can be displaced in a direction substantially orthogonal to its axial direction, but all of them are of a mechanism that the worm is pressed against the worm wheel side when the seat back is locked. Accordingly, in a state that the worm in a normal rotating movement is not pressed as when the seat back is locked, the worm needs to be born at a predetermined position so that it meshes with the worm wheel to be rotatable. If the position of the worm is not accurate, by rotation of the worm itself, whirling vibrations such that end portions in the axial direction flutter up and down occur in the worm, and an adverse effect also occurs in rotating motion of the worm itself, possibly hindering smooth rotating movement of the seat back. Further, when the seat back is locked, ones in Patent Documents 3, 4 are structured to engage the engagement member with the engagement trench ditched in a circumferential surface of the worm. Accordingly, rotation of the worm is stopped in each interval of engagement trenches and cannot be stopped in a stepless position.

The present invention has been made in order to solve the above problems, and it is an object thereof to provide a rotating movement control mechanism capable of smoothly rotating a second member with respect to a first member, and moreover, it is an object of the present invention to provide a rotating movement control mechanism capable of locking in a stepless position. Further, it is an object of the present invention to provide a seat in which the rotating movement control mechanism is incorporated.

Means for Solving the Problems

In order to solve the above problems, a rotating movement control mechanism of the present invention is a rotating movement control mechanism, wherein a second member is retained at an appropriate rotation angle with respect to a first member, the rotating movement control mechanism having: a worm provided on one of the first and second members, the worm being axially supported between bearing parts disposed on both end portions in an axial direction of the worm and being displaceable in a direction substantially orthogonal to an axial center; and a main driving side worm wheel provided on one of the first and second members across the worm and a driven side worm wheel provided on the other of the first and second members, wherein: the worm is structured to be supported between and meshing with the main driving side worm wheel and the driven side worm wheel; and the rotating movement control mechanism is structured such that the driven side worm wheel is rotated by a rotational force which relatively rotates the worm by the main driving side worm wheel, and a rotational force of the driven side worm wheel is regenerated in the worm.

Preferably, when the driven side worm wheel operates in a direction to be pressed against the worm, a backlash between the driven side worm wheel and the worm decreases to enable locking in a stepless position.

Preferably, the main driving side worm wheel is fixed to one of the first and second members across the worm; the driven side worm wheel is axially supported rotatably on one of the first and second members and on an opposite side of the main driving side worm wheel across the worm and is provided to be displaceable in a direction to be pressed against the worm; and the rotating movement control mechanism is structured such that when a rotation angle is adjusted, if the first member attempts to relatively rotate with respect to the second member, a rotational force which relatively rotates the worm is generated in the main driving side worm wheel, a rotational force of the worm rotates the driven side worm wheel and a rotational force of the driven side worm wheel is regenerated in the worm, so as to suppress whirling vibrations of the worm to stabilize a rotating motion of the worm.

Preferably, at least one of the first and second members is provided to be capable of undergoing a deformation by receiving an impact force of a predetermined value or higher, the main driving side worm wheel is pressed against the worm by the deformation and a backlash between the main driving side worm wheel and the worm in a stepless position can be reduced.

Preferably, the driven side worm wheel is supported rotatably via an eccentric shaft whose rotation center is a position eccentric from a center position of the driven side worm wheel; and when the eccentric shaft is rotated at a time of locking, the driven side worm wheel is pressed against the worm, and thereby a backlash between the driven side worm wheel and the worm is decreased, so as to limit transmission of a rotational force.

Preferably, the rotating movement control mechanism further has a brake mechanism including a member to be pressed toward a surface of the driven side worm wheel and a press member pressing the member to be pressed toward the surface of the driven side worm wheel, the member to be pressed and the press member being provided on the one member to which the driven side worm wheel is axially supported, wherein when transmission of the rotational force is limited, the member to be pressed is pressed by the press member, and thereby rotation of the driven side worm wheel is braked.

Preferably, the member to be pressed is the one of the members itself on which the driven side worm wheel is axially supported, the press member is constituted of a nut screwed on the eccentric shaft to rotate on an opposite side of the driven side worm wheel across the one of the members, and when transmission of the rotational force is limited, the one of the members is pressed in a direction of a movable gear by rotating the nut in a fastening direction.

Preferably, a cam engaging with the eccentric shaft and rotating together with the eccentric shaft is disposed, and an operating member is screwed on the eccentric shaft together with the nut and coupled to the cam via a lock shaft; and at a time of locking, when the operating member is pivoted, the eccentric shaft rotates via the cam to press the driven side worm wheel against the worm, the operating member is pivoted together with the nut from a position where rotation of the eccentric shaft is stopped by the pressing, and the nut is further rotated in a fastening direction to press the member in a direction of the driven side worm wheel.

Preferably, the main driving side worm wheel is provided integrally as a part of one of either the first member or the second member.

Preferably, the driven side worm wheel is structured to be larger in mass than the worm, and a force corresponding to the mass of the driven side worm wheel works on the worm, to thereby suppress whirling vibrations of the worm.

Preferably, by the worm provided being displaceable in a direction substantially orthogonal to an axial center, the worm, the driven side worm wheel, and the main driving side worm wheel are structured such that when respective teeth thereof mesh to operate, one tooth enters other teeth in a wedge-like manner, and pluralities of teeth thus mesh with each other.

Preferably, the first member and the second member are two relatively rotating members among a plurality of members constituting a seat, and are used as members for the seat.

Preferably, the first member is one of members constituting a frame of a seat cushion, and the second member is one of members constituting a frame of a seat back, the first member and the second member being used as a reclining adjuster adjusting an inclination angle of the seat back with respect to the seat cushion.

Further, a seat of the present invention is a seat including a seat cushion and a seat back, wherein any one of the above-described rotating movement control mechanisms is provided between two relatively rotating members among a plurality of members constituting the seat. Preferably, the rotating movement control mechanism is provided between one of members constituting a frame of the seat cushion and one of members constituting a frame of the seat back, and further preferably, the rotating movement control mechanism is provided as a reclining adjuster.

Effect of the Invention

The present invention has a worm, and a main driving side worm wheel and a driven side worm wheel which are disposed across the worm. Further, both end portions in an axial direction of the worm are axially supported by bearing parts, and the worm is provided to be displaceable in a direction substantially orthogonal to the axial center. That is, the both end portions in the axial direction of the worm are axially supported by bearing parts, and in a direction substantially orthogonal to an axial center of the worm, respective teeth of the main driving side worm wheel and the driven side worm wheel contact both sides of the worm in the direction substantially orthogonal to the axial center with an appropriate backlash, and are supported thereby. Therefore, when the second member is relatively rotated with respect to the first member, the worm rotates relatively by a rotational force of the main driving side worm wheel. The driven side worm wheel rotates by a rotational force of the worm, and a rotational force of the driven side worm wheel is regenerated in the worm. Whirling vibrations of the worm are suppressed thereby, rotating motion of the worm becomes smooth, and relative rotation of the second member with respect to the first member is performed smoothly. This is a structure in which two worm wheels are disposed across the worm to thereby stabilize rotating motion of the worm, and thus the worm itself needs to be disposed with a slight play with respect to the bearing parts, that is, provided to be displaceable in the direction substantially orthogonal to the axial center. Conversely, according to the present invention, without bearing the worm in an accurate position for smooth rotating motion, automatic alignment is performed to retain the worm in an appropriate position by movement of the two worm wheels, by which smooth rotating motion can be achieved. Consequently, this also contributes to simplification of manufacturing processes and reduction of manufacturing costs.

On the other hand, at a time of being locked, by pressing the driven side worm wheel against the worm, a backlash between the both can be reduced to lock them. According to the present invention, they can be locked in a stepless position because it is not a structure to engage with a trench formed in the surface of a tooth as in conventional Patent Document 4. Further, since the worm is provided to be displaceable in the direction substantially orthogonal to the axial center, tooth planes of the driven side worm wheel and the worm are in a surface contact with each other, that is, one tooth enters other teeth in a wedge-like manner, by which the backlash can be decreased reliably. Further, by one tooth entering other teeth in a wedge-like manner, pluralities of teeth mesh with each other, obtaining higher lock strength than in the case of meshing of one tooth with each other.

Further, one of the frames to which the main driving side worm wheel is fixed is preferably provided to be capable of undergoing a deformation by receiving an impact force of a predetermined value or higher. By the deformation, the main driving side worm wheel is pressed against the worm, and respective teeth of the main driving side worm wheel and the worm mesh in a wedge-like manner, by which the backlash can further be decreased than at a time of being locked. Specifically, when an impact force is applied by a collision or the like, the backlash between respective gears decreases further, and all the gears are substantially integrated. Accordingly, the rotating movement control mechanism itself of the present invention used as a reclining adjuster or the like can exhibit high strength which does not depend on a section modulus and yield stress of a tooth bottom even in a state that an impact force is applied, and hence can suppress deformation of members.

DESCRIPTION OF EMBODIMENTS

Figure 1:
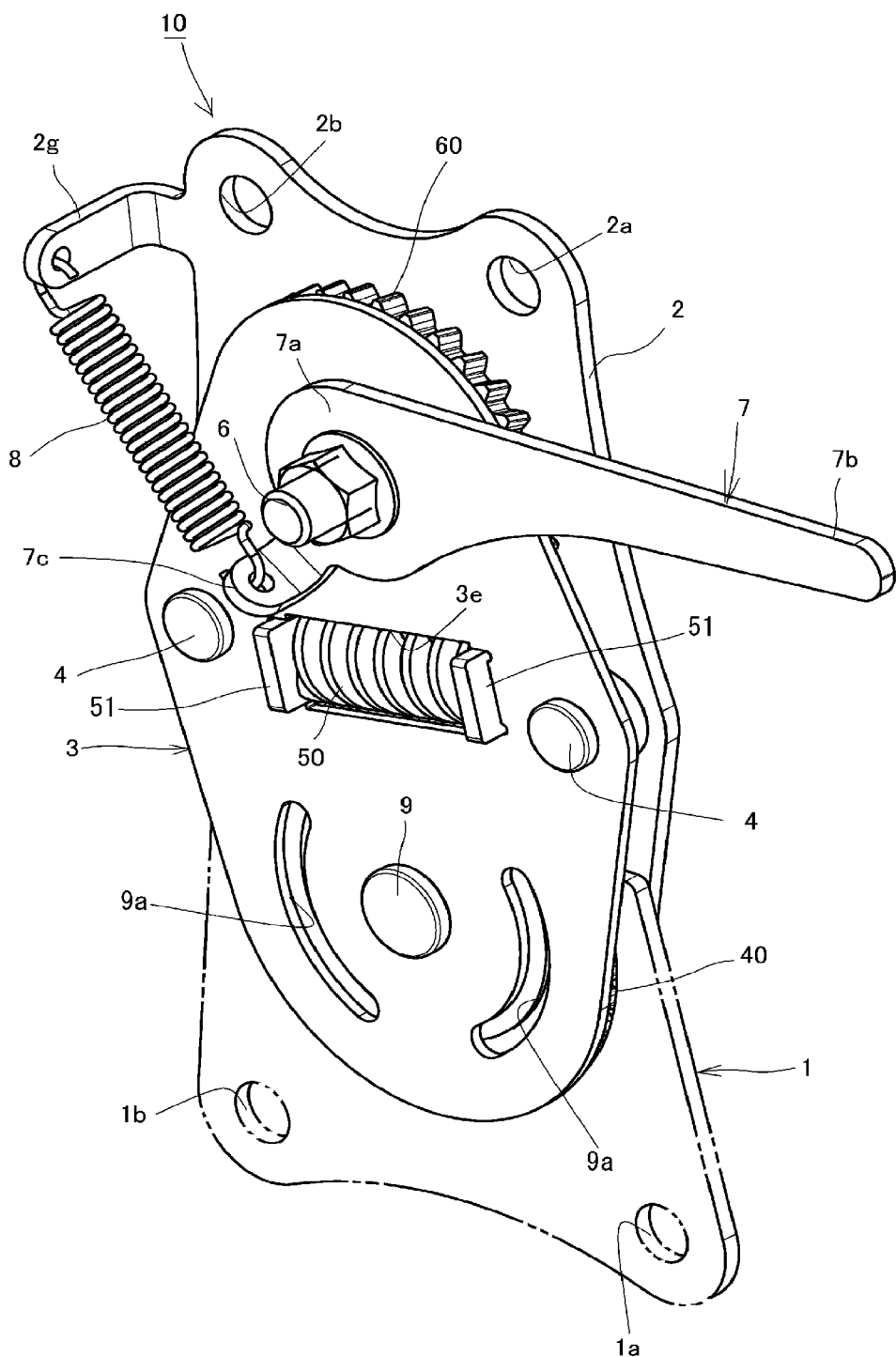
FIG. 1 is a perspective view illustrating an entire reclining adjuster according to one embodiment of the present invention.
Figure 2:
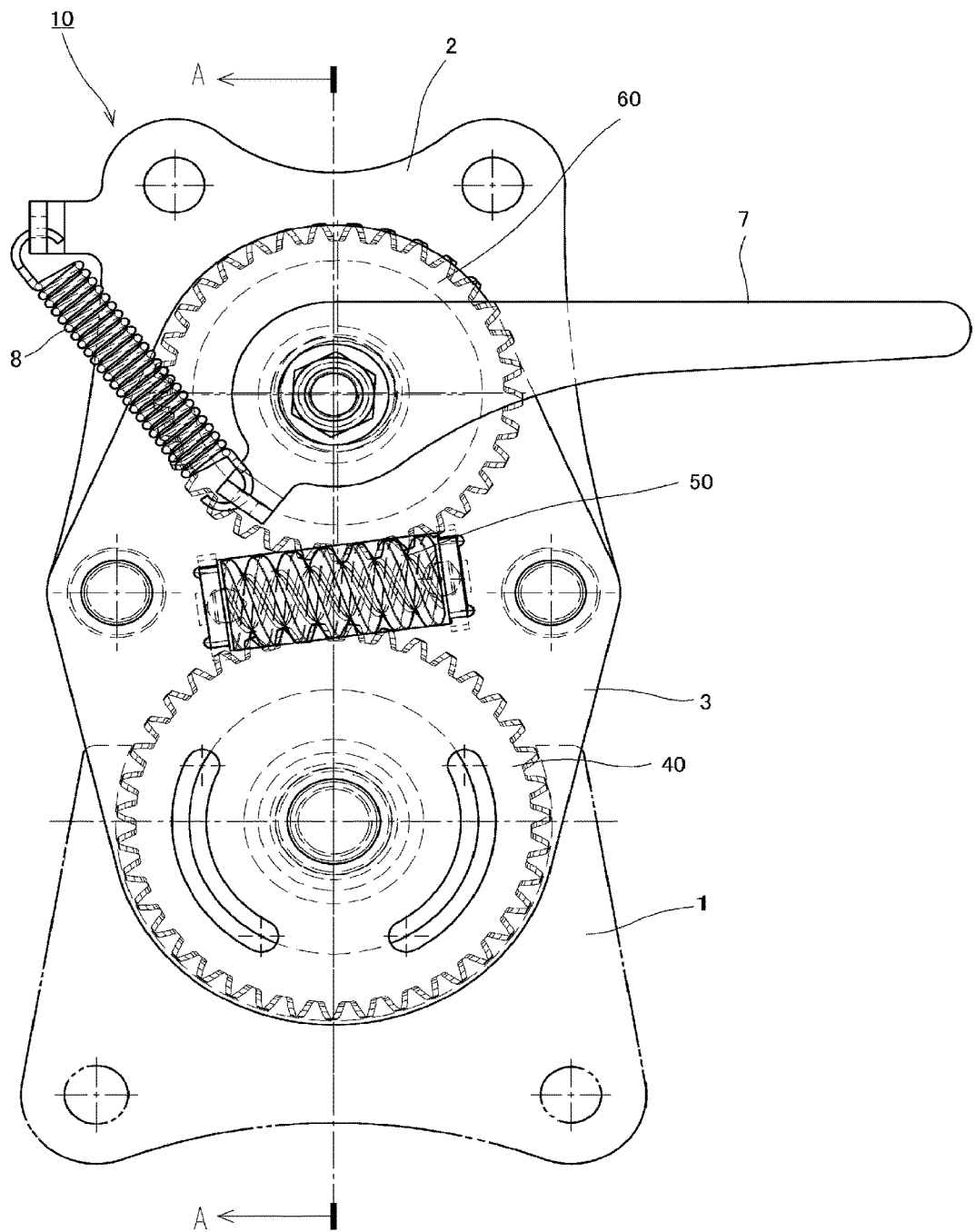
FIG. 2 is a front view of FIG. 1.
Figure 3:
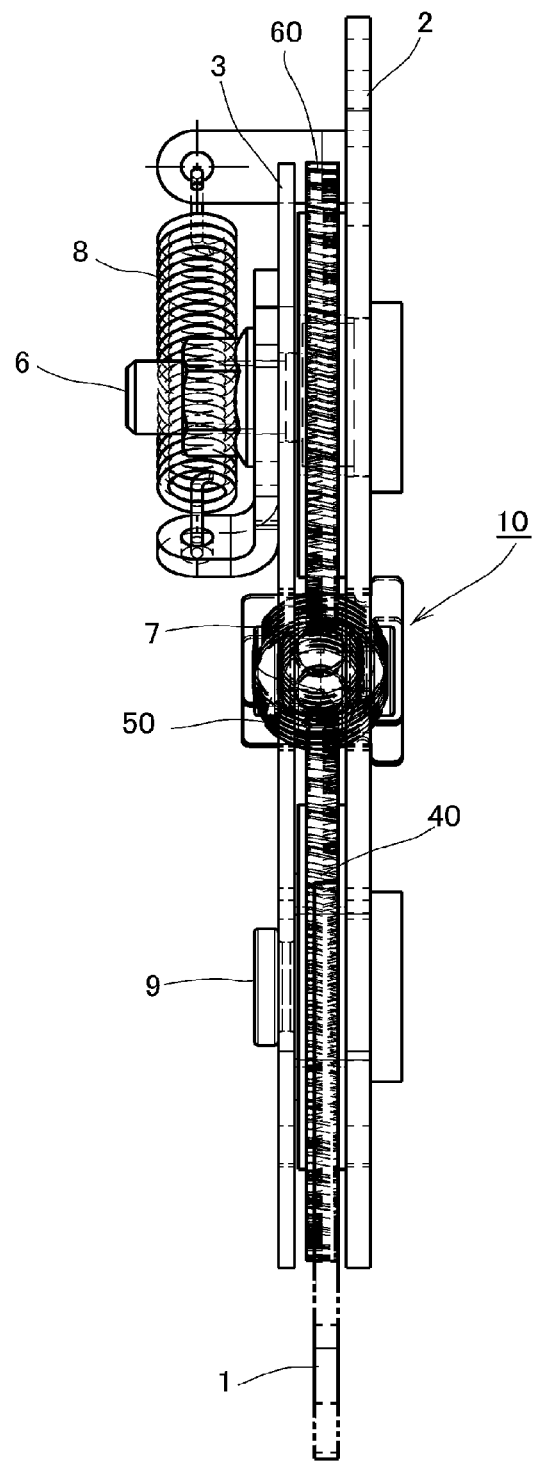
FIG. 3 is a side view of FIG. 1.

Hereinafter, the present invention will be described in further detail based on an embodiment illustrated in drawings. In this embodiment, a reclining adjuster 10 of a seat will be described for example, which is a typical example of a rotating operation control mechanism of the present invention. As illustrated in FIG. 1 to FIG. 5, the reclining adjuster 10 of this embodiment includes a cushion-side bracket 1 as a first member attached to a rear portion of a side frame of a seat cushion frame (equivalent to "one of members constituting a frame of a seat cushion"), and back-side brackets 2, 3 as a second member attached to a lower portion of a side frame of a seat back frame (equivalent to "one of members constituting a frame of a seat back").

Attachment holes 1a, 1b are formed penetrating a lower portion of the cushion-side bracket 1, and via these attachment holes 1a, 1b, the bracket is attached with bolts to the rear portion of the side frame of the seat cushion frame. On the cushion-side bracket 1, a main driving side worm wheel 40 is fixed by welding for example. A portion in a circumferential direction of this main driving side worm wheel 40 projects from an upper portion of the cushion-side bracket 1, and teeth formed in a circumference of this projecting range form a use area of the main driving side worm wheel 40. The main driving side worm wheel 40 may be a gear in which teeth are formed on the entire circumference, or may be a sector gear in which teeth are formed only in the use area. Further, either of the cases of the main driving side worm wheel 40 and a driven side worm wheel 60, which will be described later, includes cases of using a helical gear as the worm wheel.

The back-side brackets 2, 3 are constituted of two brackets disposed to oppose each other. Attachment holes 2a, 2b are formed in an upper portion of the back-side bracket 2 disposed inside, and via these attachment holes 2a, 2b, the bracket is attached with bolts to the side frame of the seat back frame. In substantially middle portions in a height direction in the vicinities of both sides of the back-side brackets 2, 3, coupling holes 2c, 2d, 3c, 3d are formed, and the brackets are coupled with a predetermined interval via coupling rivets 4, 4 between the coupling holes 2c and 3c and between the coupling holes 2d and 3d corresponding to each other. In the two back-side brackets 2, 3, in the vicinities of substantially middle portions in the height direction, worm disposing holes 2e, 3e are formed, which are long in a width direction of the back-side brackets 2, 3, and a worm 50 is supported in the worm disposing holes 2e, 3e. Specifically, the worm is supported so that the axial direction of the worm 50 is along a longitudinal direction of the worm disposing holes 2e, 3e. The worm 50 is disposed to mesh with the above-described main driving side worm wheel 40.

Figure 9:
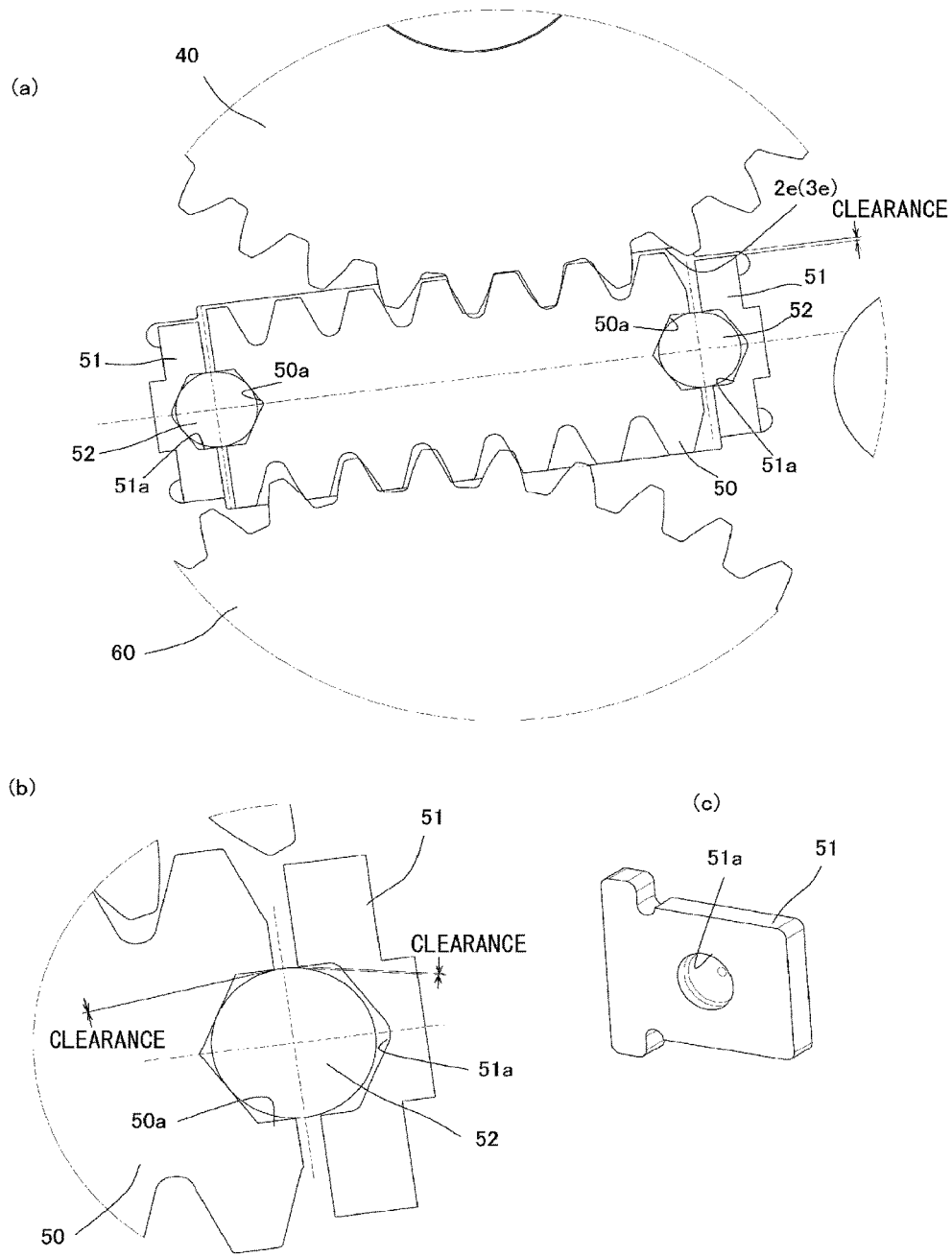
FIGS. 9(*a*) to (*c*) are views for explaining the structures of bearing parts of a worm, in which (a) is a view illustrating by including the bearing parts of both end portions of the worm, (b) is an enlarged view illustrating a main part of one bearing illustrated in (a), and (c) is a perspective view illustrating a bearing holder.

Here, as illustrated in FIG. 9, the worm 50 is supported via its both end portions in the axial direction by bearing parts, each of which being disposed in one of both end portions of the worm disposing holes 2e, 3e. Each bearing part is formed having a bearing holder 51, 51 and a ball 52, 52 which are disposed in one of the both end portions of the worm disposing holes 2e, 3e. A bearing hole 51a, 51a is formed in a substantially center portion of each bearing holder 51, 51 and a ball disposing hole 50a, 50a is formed in each of the both end portions in the axial direction of the worm 50, and a ball member 52, 52 is loaded and supported between the ball disposing hole 50a, 50a and the bearing hole 51a, 51a. Clearances (plays) are provided each between the ball 52 and the ball disposing hole 50a, between the ball 52 and the bearing hole 51a, and further between the bearing holder 51 and the worm disposing hole 2e (3e), and by the amounts corresponding to the clearances, the worm 50 is displaceable in a direction substantially orthogonal to an axial center direction.

Figure 4:
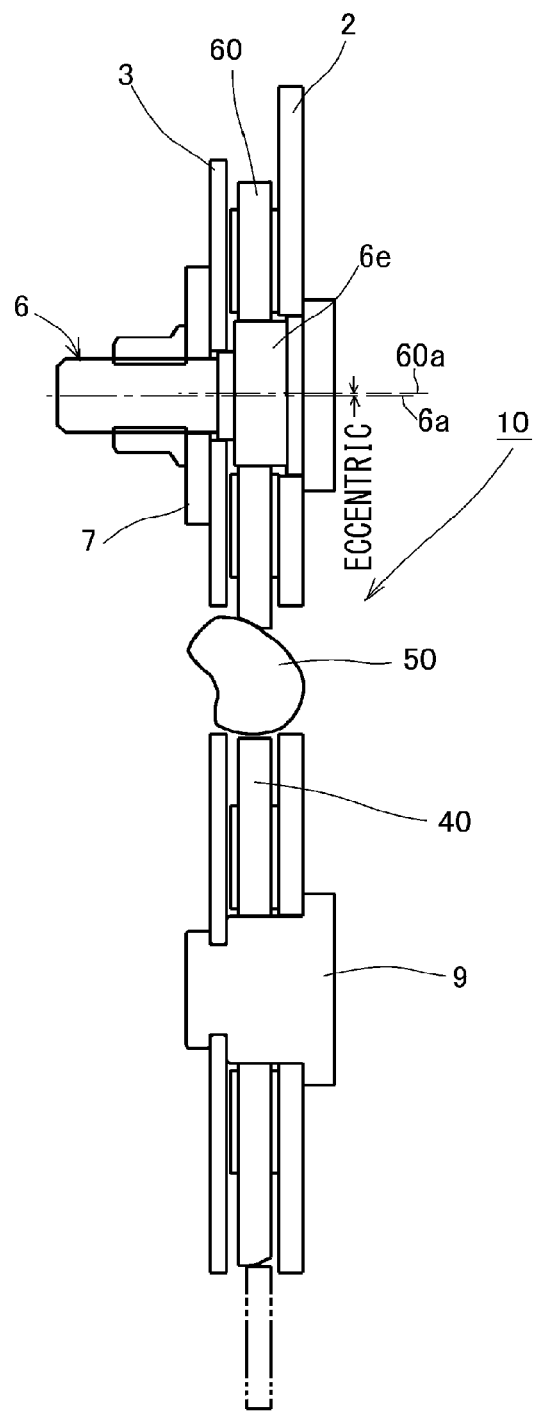
FIG. 4 is an arrow view of an A-A line of FIG. 2.
Figure 6:
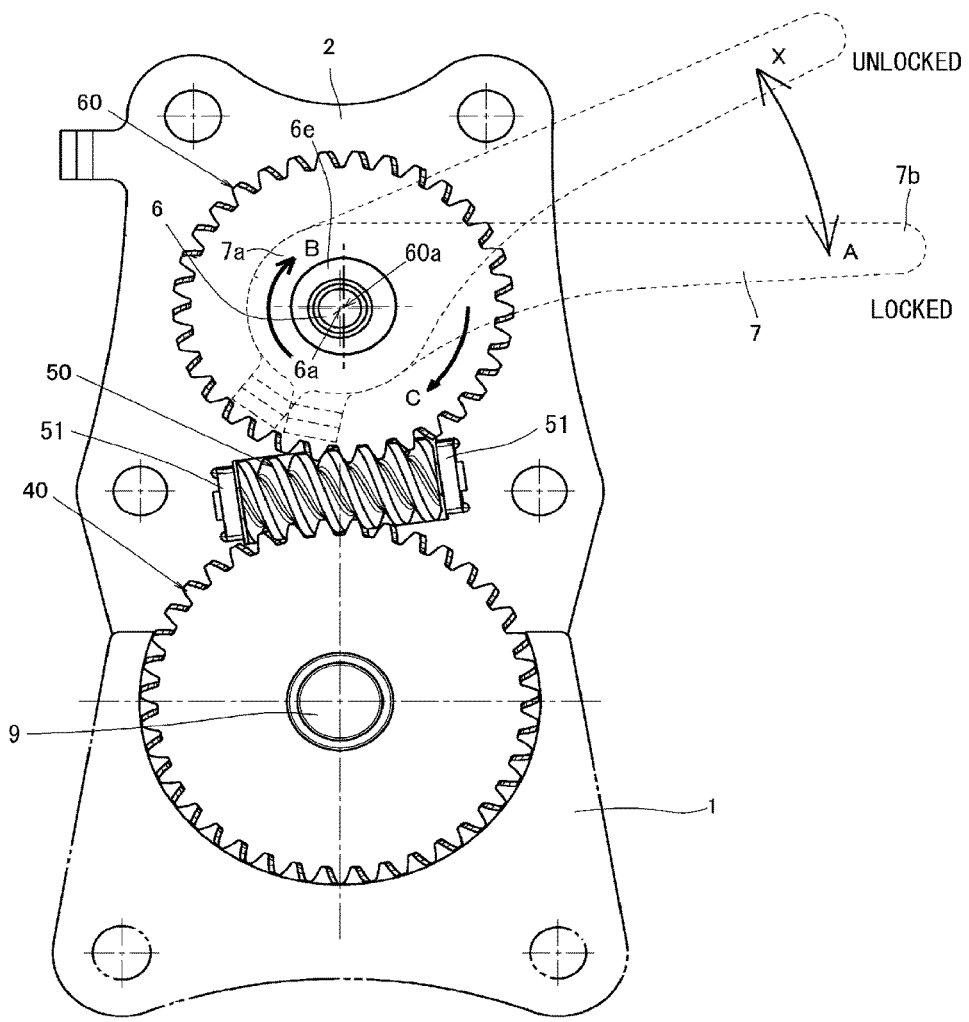
FIG. 6 is a view for explaining operation of the embodiment.
Figure 8:
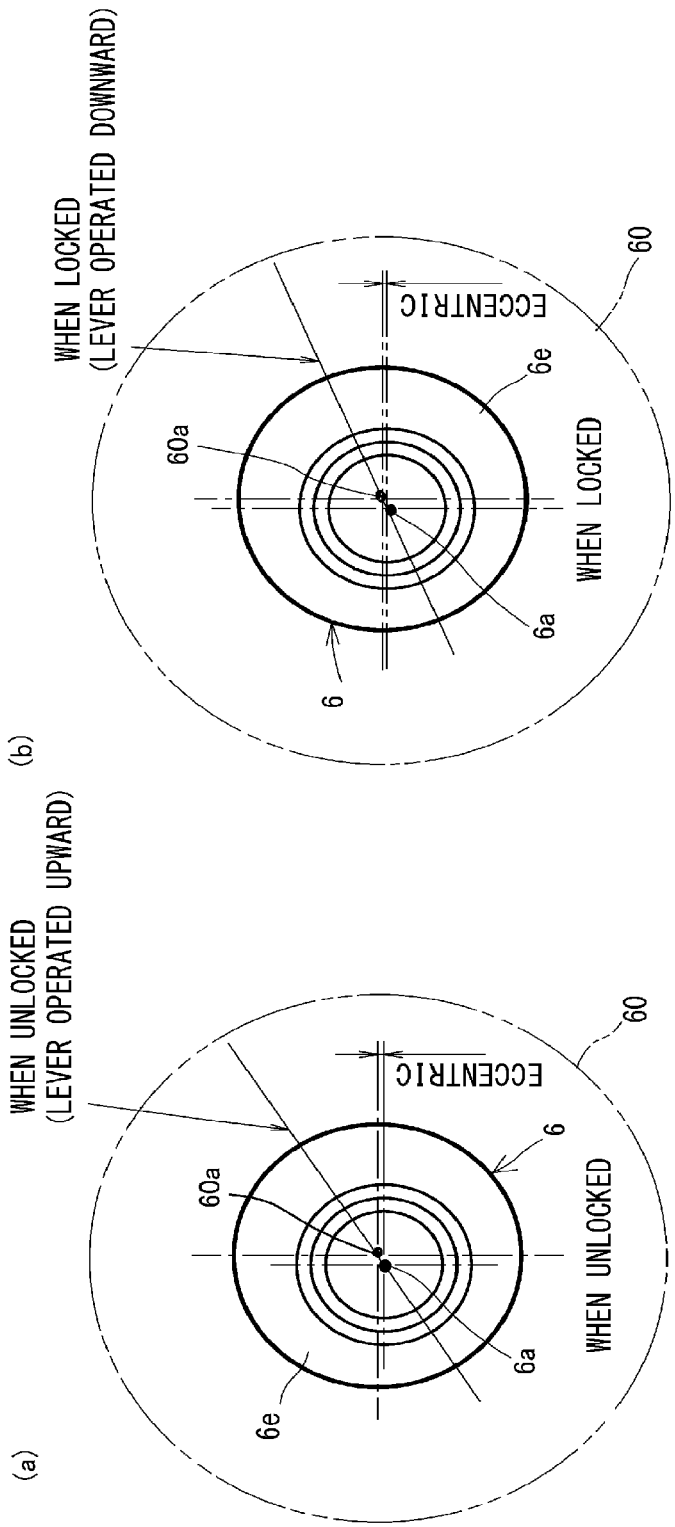
FIGS. 8(*a*), (*b*) are views for explaining a positional relation between the center of an eccentric shaft and the center of a driven side worm wheel.

Above the worm disposing holes 2e, 3e of the back-side brackets 2, 3, shaft insertion holes 2f, 3f are formed to penetrate, through which an eccentric shaft 6 is inserted. Between the back-side brackets 2, 3, the driven side worm wheel 60 which is a movable gear is disposed to mesh with the worm 50, and this driven side worm wheel 60 is disposed so that the eccentric shaft 6 inserted through the shaft insertion holes 2f, 3f is at a rotation center. Specifically, as illustrated in FIG. 4, FIG. 6 and FIG. 8, the driven side worm wheel 60 is attached to a large diameter part 6e with a lateral cross-sectional shape being circular in the eccentric shaft 6. A center 6a of the eccentric shaft 6 is eccentric to a center 60a of the driven side worm wheel 60, and the driven side worm wheel 60 rotates about this eccentric position (center 6a of the eccentric shaft 6). By the main driving side worm wheel 40 and the driven side worm wheel 60 thus disposed to oppose across the worm 50, a force according to the mass of the driven side worm wheel 60 is regenerated in the worm 50, and out of a force in the axial center direction (tangential direction) working on the worm 50 and a force in a direction (substantially normal direction) substantially orthogonal to the axial center direction, the force in the substantially normal direction is canceled. Accordingly, whirling vibrations of the worm 50 are eliminated and a rotating motion of the worm 50 becomes stable, and moreover, a rotating motion of the driven side worm wheel 60 itself meshing with the worm 50 also becomes stable, thereby making these rotating operations smooth. In addition, in order to enable this operation to the worm 50 of the driven side worm wheel 60 to function sufficiently, the driven side worm wheel 60 is preferred to be larger in mass than the worm 50.

To one end portion of the eccentric shaft 6, a base end portion 7a of an operating lever 7 as an operating member is coupled and fixed. Further, on a rear end of the operating lever 7, a spring attachment part 7c is provided. Also on an upper portion of the back-side bracket 2 disposed inside, a spring attachment part 2g is provided, a return spring 8 is bridged across the spring attachment parts 7c, 2g to bias the operating lever 7 so that its front end portion 7b is in a direction to lock which is to pivot downward.

Here, in the back-side brackets 2, 3, insertion holes 2h, 3h for a rotation shaft 9 are formed in positions lower than the worm disposing holes 2e, 3e, and similarly an insertion hole 1h for the rotation shaft 9 is formed penetrating in a position of the cushion-side bracket 1 corresponding to the insertion holes 2h, 3h. Therefore, when the seat back is inclined, the back-side brackets 2, 3 rotate forward or backward with respect to the cushion-side bracket 1 about the rotation shaft 9. Note that in this embodiment, the insertion hole 1h is formed in the center of the main driving side worm wheel 40, but it is formed because the main driving side worm wheel 40 is disposed at this position. The main driving side worm wheel 40, as described above, just needs to have the use area where the teeth project from the upper portion of the cushion-side bracket 1.

Next, operation of this embodiment will be described based on FIG. 6 and FIG. 7. First, in a state of being unlocked, the front end portion 7b of the operating lever 7 is at an upper position resisting an elastic force of the return spring 8. In this state, when the retaining force by which the operating lever 7 is positioned at the upper position is released (for example, when the hand which has been operating it is released), the elastic force of the return spring 8 makes the front end portion 7b of the operating lever 7 to pivot downward clockwise (arrow A direction of FIG. 6). Then, the eccentric shaft 6 coupled and fixed to the base end portion 7a of the operating lever 7 similarly rotates clockwise, that is, rotates in an arrow B direction of FIG. 6. When the eccentric shaft 6 rotates in the arrow B direction, since the rotation center 6a is eccentric from the center 60a of the driven side worm wheel 60, this rotation operates as a force to rotate the driven side worm wheel 60 clockwise, that is, to push down the driven side worm wheel in an arrow C direction. As a result, the driven side worm wheel 60 is pushed down in the direction to the worm 50, the gaps between their teeth become small, moreover the worm 50 inclines by the amounts of clearances (see FIG. 9) of the load bearing parts of the worm 50, and furthermore, the engagement force between the driven side worm wheel 60 and the worm 50 increases, generating a large friction force. Since it is pressed against the direction of the worm 50, the worm 50 itself is pressed against the main driving side worm wheel 40, the gaps between their teeth become small or meshing between the worm 50 and the main driving side worm wheel 40 changes, contact areas of gears with each other increase, and thereby three gears 40, 50, 60 become mutually non-rotatable and locked at their positions.

According to this embodiment, it is a structure to lock the rotating movement by the three gears 40, 50, 60, which does not require a dedicated latch member or the like for locking as in the conventional structure and has a simple structure. Further, by combining the three gears, meshing of the gears with each other changes, and high load capacity strength can be obtained.

On the other hand, to unlock from the locked state, as illustrated in FIG. 6, the operating lever 7 is pivoted upward counterclockwise against the elasticity of the return spring 8, that is, in an arrow X direction. This rotates the eccentric shaft 6 in the counterclockwise direction, and accompanying this, the driven side worm wheel 60 is also pushed upward counterclockwise. Accordingly, the gaps between the respective teeth of the driven side worm wheel 60 and the worm 50 and between the respective teeth of the worm 50 and the main driving side worm wheel 40 become an appropriate backlash to allow their respective rotation, and their centers are aligned autonomously. Then, when it is attempted to incline the seat back forward or backward as illustrated in FIG. 7, the back-side brackets 2, 3 pivot forward or backward about the rotation shaft 9 with respect to the cushion-side bracket 1 as depicted with two-dot chain lines in FIG. 7.

Figure 7:
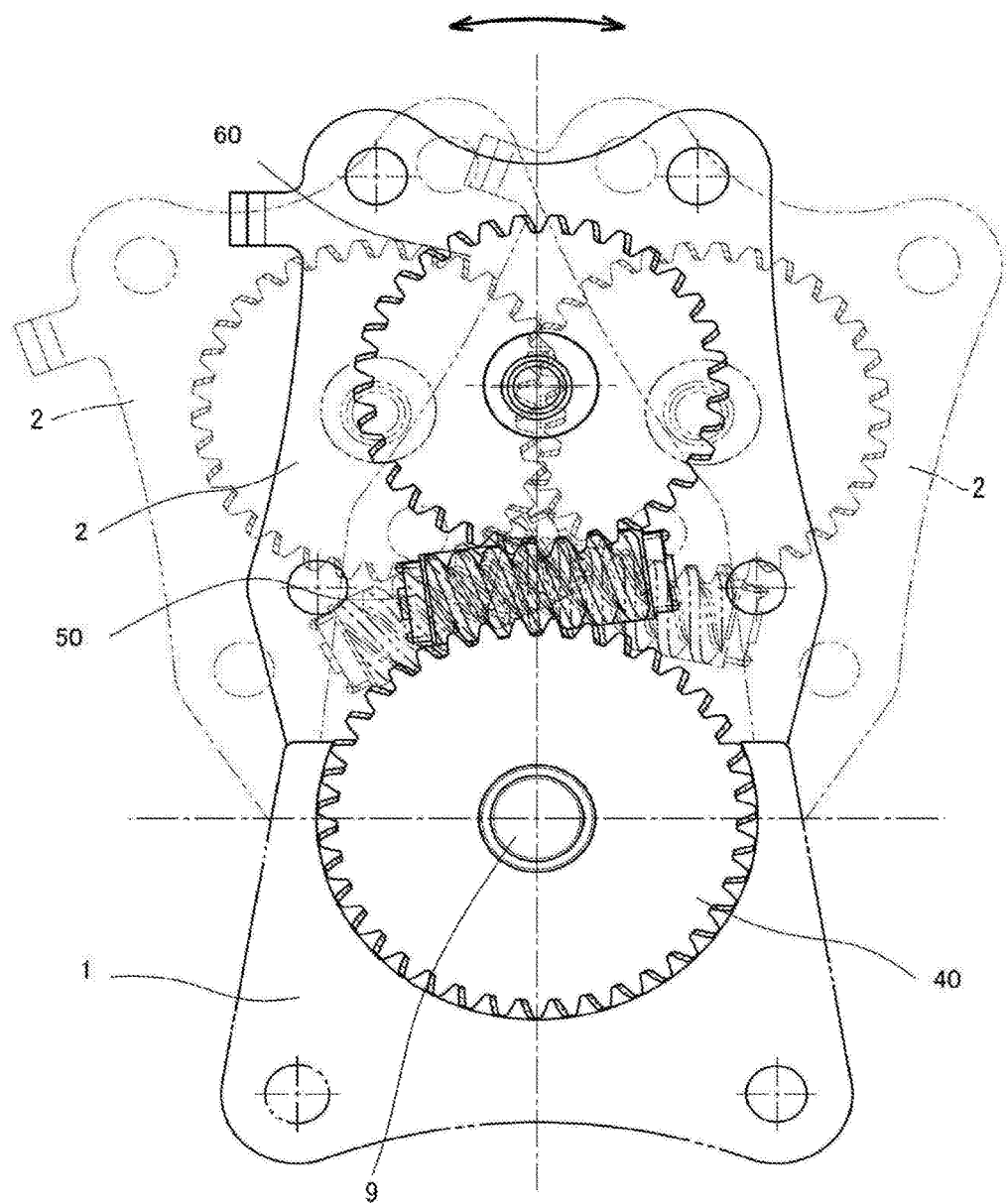
FIG. 7 is a view for explaining operation of the embodiment.

When the back-side brackets 2, 3 pivot forward or backward with respect to the cushion-side bracket 1 as depicted with two-dot chain lines in FIG. 7, the worm 50 also pivots forward or backward together with the back-side brackets 2, 3. However, since the worm 50 meshes with the main driving side worm wheel 40, when the back-side brackets 2, 3 move forward or backward, the worm 50 moves forward or backward together with them and meanwhile rotates about its axial center. By rotation of the worm 50, the driven side worm wheel 60 rotates about the eccentric shaft 6. Specifically, when the operating lever 7 is operated upward to incline the seat back either forward or backward, the back-side brackets 2, 3 also attempt to incline forward or backward. At this time, the worm 50 rotates due to the meshing with the main driving side worm wheel 40, and moreover the driven side worm wheel 60 meshing with this worm 50 rotates. Thus, by their movements, the inclining operation of the seat back can be performed. Note that the worm 50 rotates by a rotational force of the main driving side worm wheel 40, and thus the helix angle of the worm 50 is set to be equal to or larger than a friction angle of the main driving side worm wheel 40. Further, if a helical gear is employed as the main driving side worm wheel 40 and the driven side worm wheel 60, it can be more easily made as a structure satisfying the above condition of friction angle by setting of the helix angle of this helical gear, and hence is preferred.

Further, preferably, the cushion-side bracket 1 to which the main driving side worm wheel 40 is fixed is structured to be capable of undergoing a deformation by receiving an impact force of a predetermined value or higher. For this deformation, preferably, it is formed to be capable of undergoing a deformation by a force equal to or less than load capacity strength in design which is exhibited among the main driving side worm wheel 40, the worm 50, and the driven side worm wheel 60, in a state that the back-side brackets 2, 3 are locked at a predetermined angle with respect to the cushion-side bracket 1.

Figure 10:
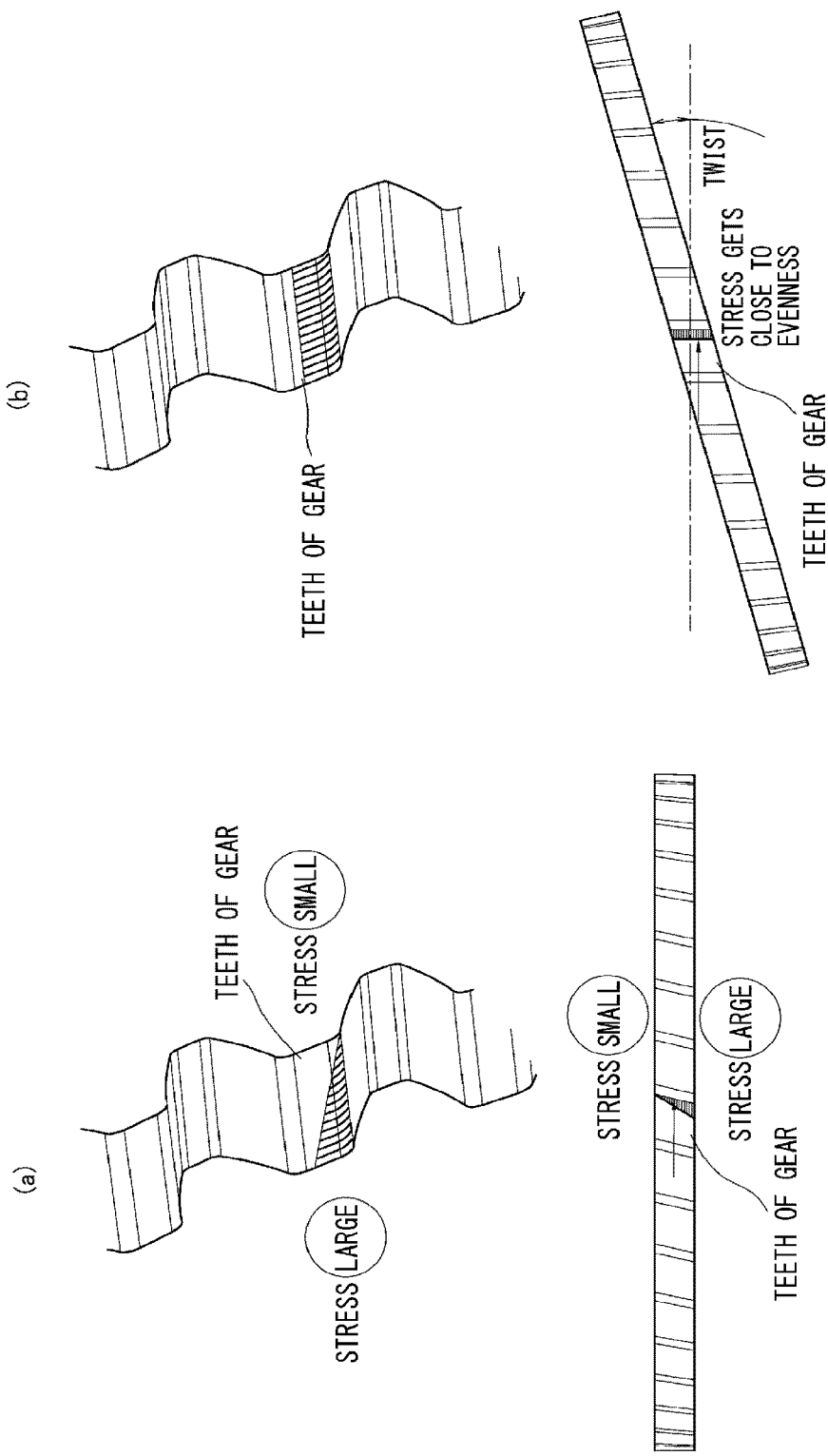
FIGS. 10(*a*), (*b*) are views for explaining about a deformation of a cushion-side bracket supporting a main driving side worm wheel.
Figure 11:
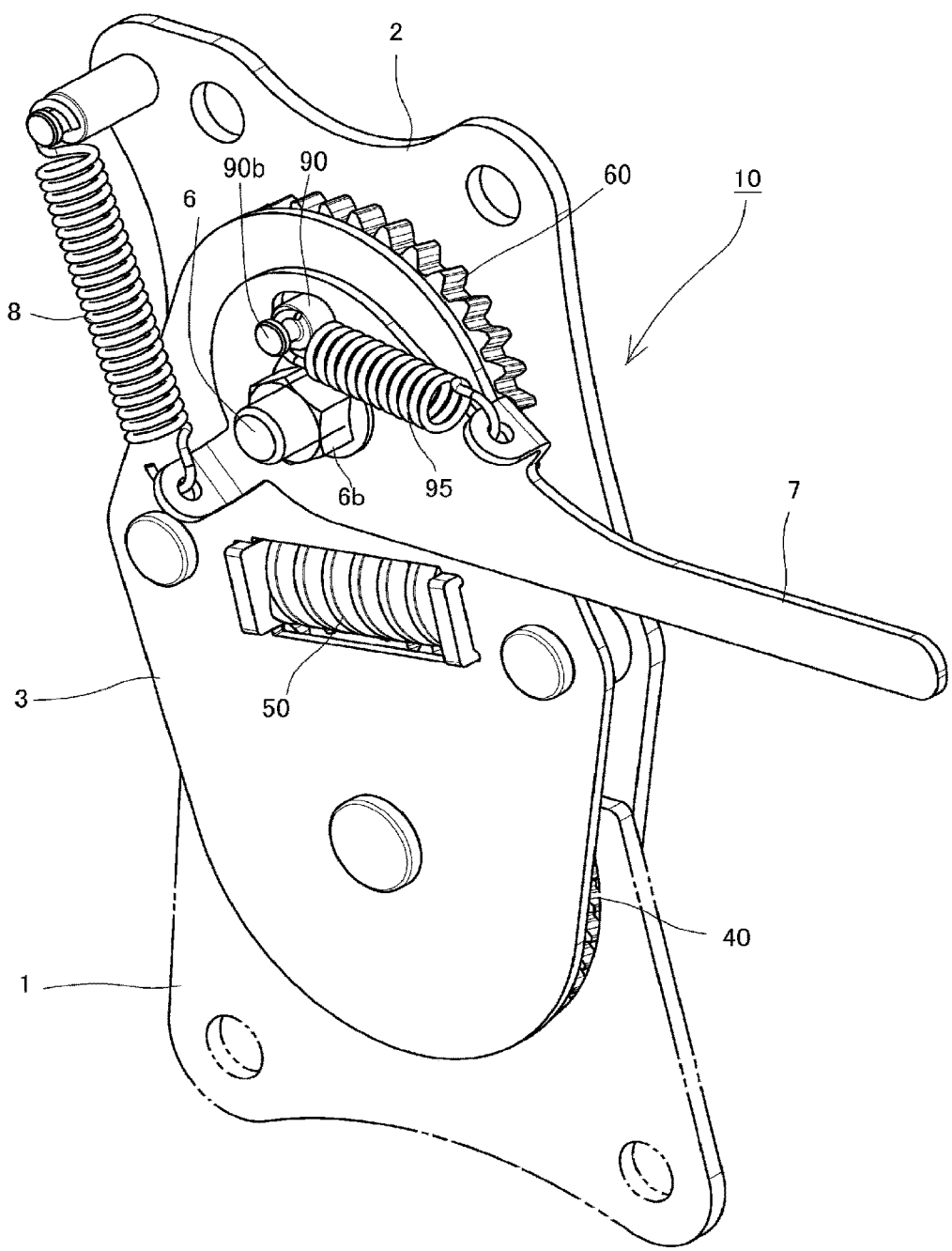
FIG. 11 is a perspective view illustrating a reclining adjuster according to another embodiment of the present invention.
Figure 12:
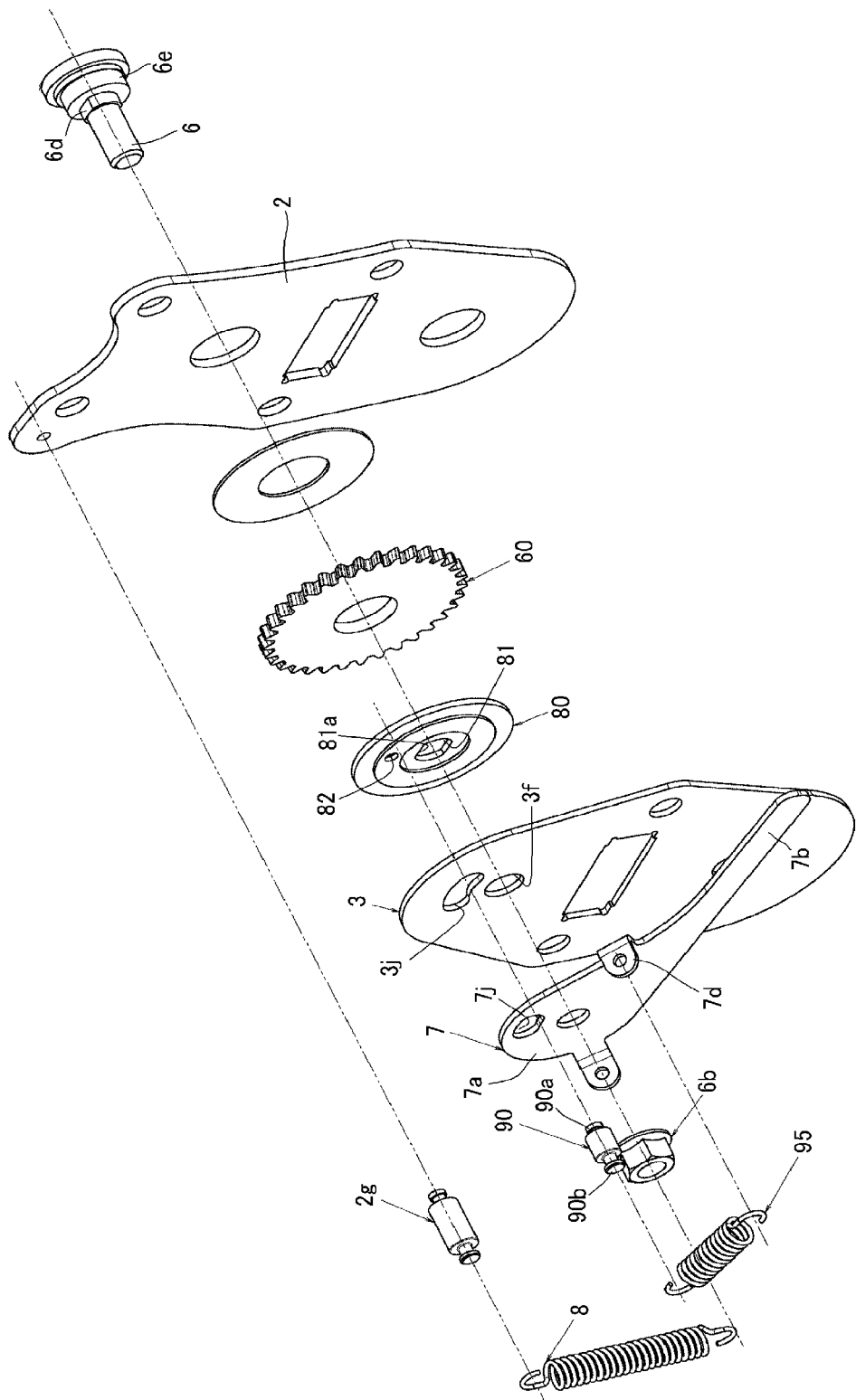
FIG. 12 is a partially exploded view of FIG. 11.
Figure 13:
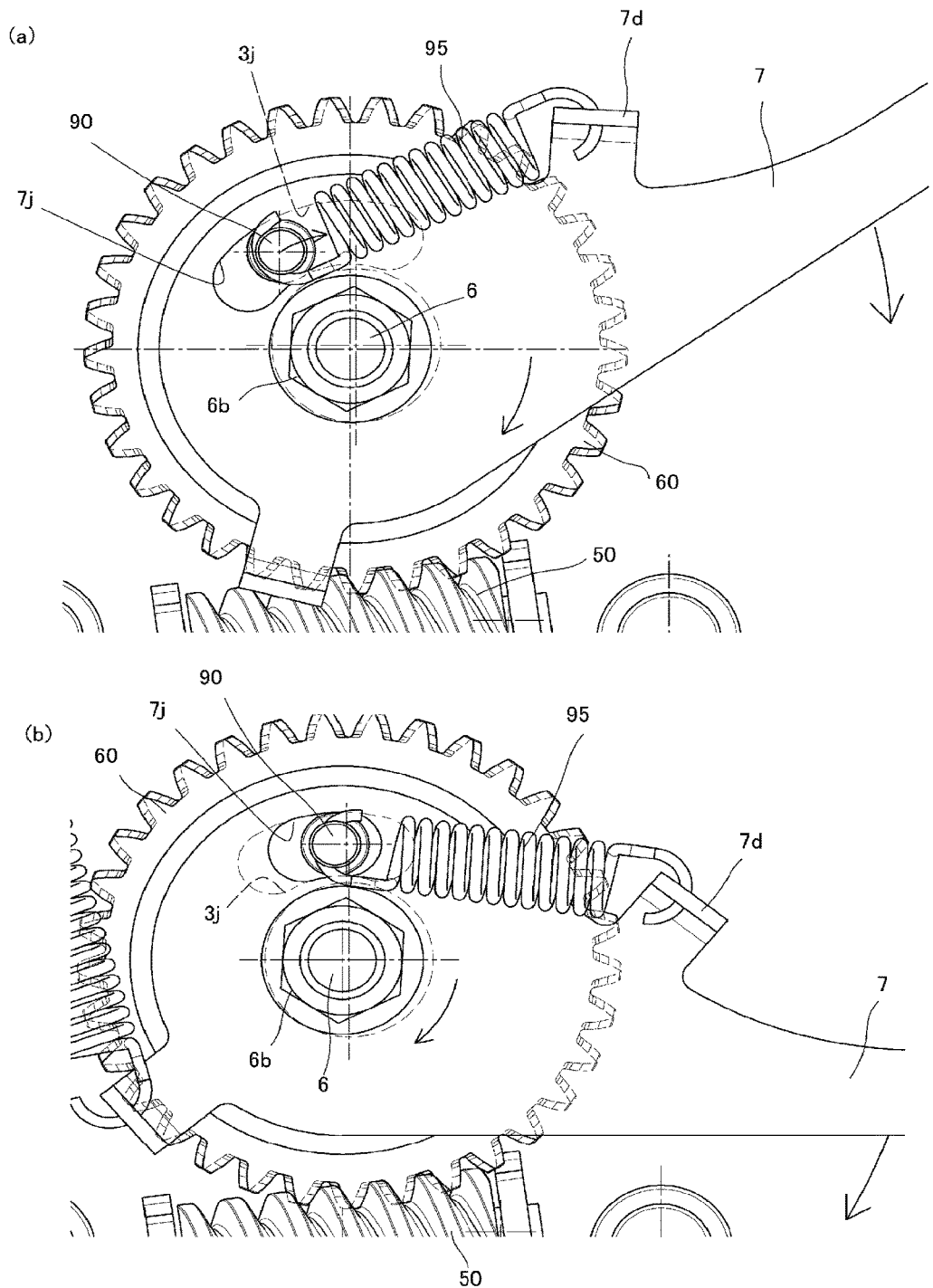
FIGS. 13(*a*), (*b*) are views for explaining operation when locked.
Figure 14:
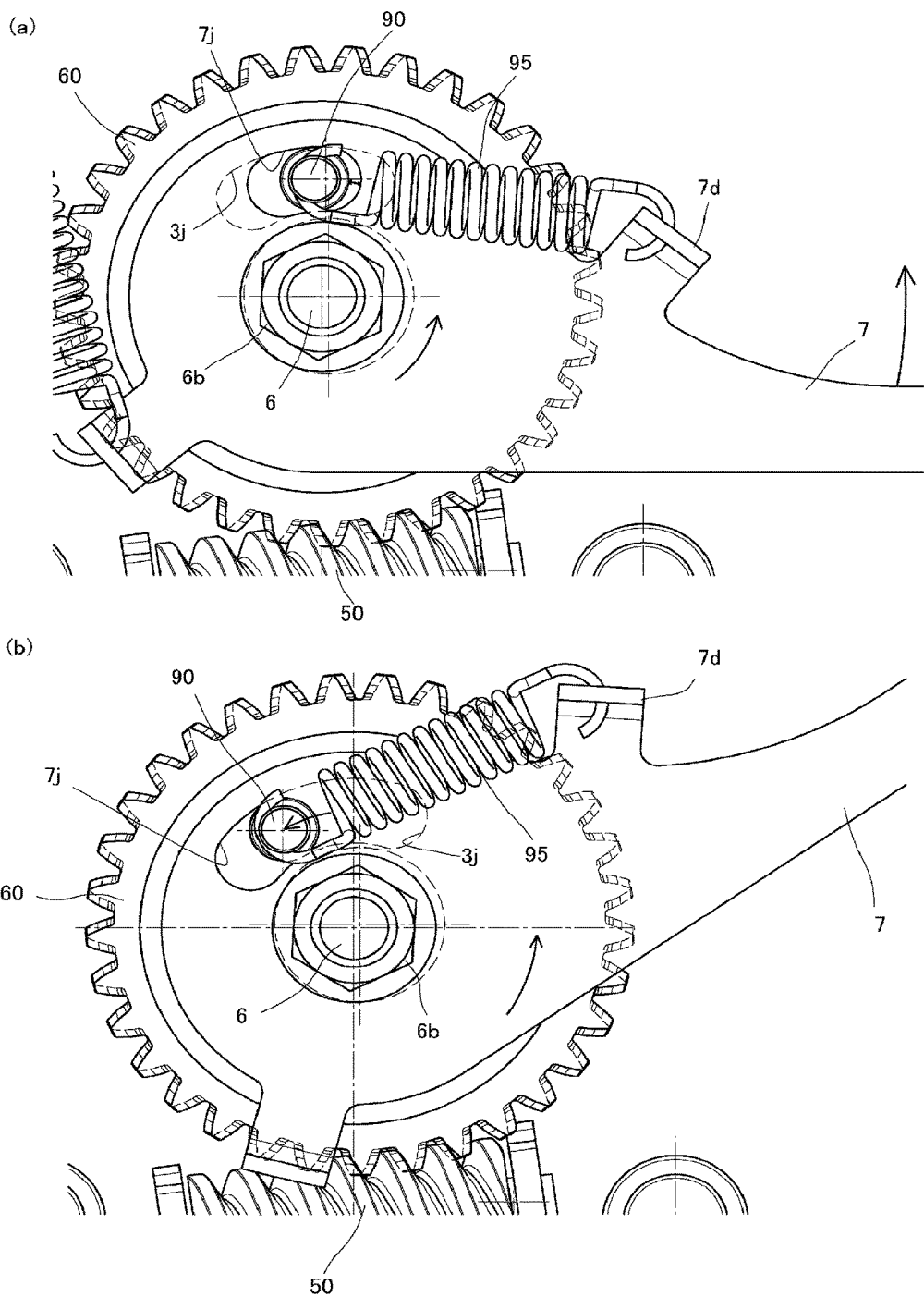
FIGS. 14(*a*), (*b*) are views for explaining operation when unlocked.

Specifically, a structure in which the cushion-side bracket 1 supporting the main driving side worm wheel 40 will not be deformed when receiving an impact force of a predetermined value or higher, that is, a structure which will not be deformed when the load capacity strength in design exhibited among the main driving side worm wheel 40, the worm 50, and the driven side worm wheel 60 is reached, stress of the input load concentrates to one side of a tooth as illustrated in FIG. 10(a). Thus, a displacement occurs in meshing of the gears 40, 50, 60, and conversely it cannot withstand until the predetermined load capacity strength is reached. On the other hand, when the cushion-side bracket 1 is deformed to twist under the above condition as illustrated in FIG. 10(b), stress of the input load occurs evenly on plural meshing teeth, and the three gears 40, 50 60 become like an integrated stiff body. Thus, higher strength can be exhibited, and deformation of the frames when a high impact force is applied can be suppressed. Consequently, the seat can easily keep a predetermined shape, which can improve the ability of the occupant to escape to the outside of the vehicle in case of emergency.

Figure 5:
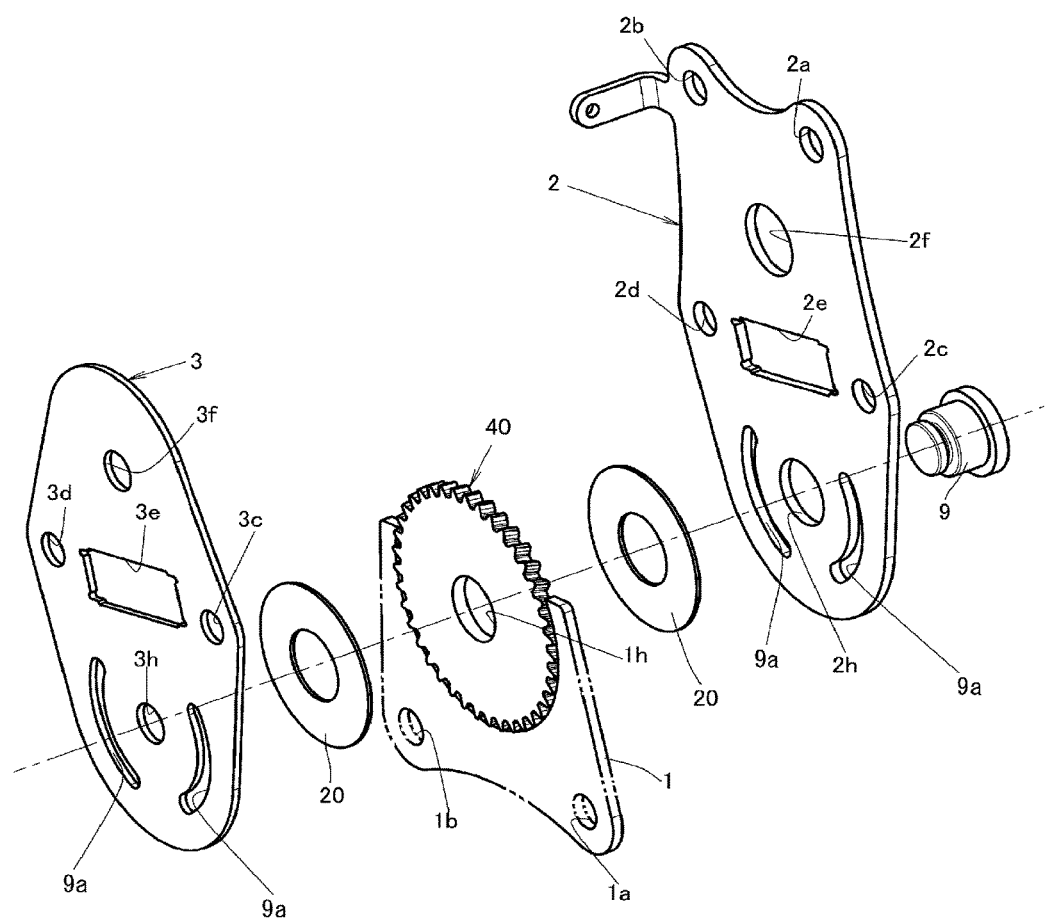
FIG. 5 is a partially exploded view of FIG. 1.

In addition, in order to facilitate the above-described twisting deformation of the cushion-side bracket 1, as illustrated in FIG. 1 and FIG. 5, it is preferred to form long holes 9a in a substantially ellipse shape in positions closer to the lower side of the back-side brackets 2, 3 corresponding to the cushion-side bracket 1. Further, in order to make such a deformation take place easily, besides means to form such long holes 9a, it is also possible to dispose a washer made of rubber, synthetic resin, or the like as a washer 20 which is disposed at least either between one back-side bracket 2 and the cushion-side bracket 1 illustrated in FIG. 5 or between the other back-side bracket 3 and the cushion-side bracket 1.

FIG. 11 to FIG. 14 are views illustrating an embodiment of the reclining adjuster 10 in which the structure of the mechanism to exhibit a locking operation by the operating lever 7, which is an operating member, and the driven side worm wheel 60, and so on is changed.

Specifically, in this embodiment, a long hole 3j in an arc shape is formed in an upper position of the shaft insertion hole 3f of the back-side bracket 3 on the outside. Further, in the base end portion 7a of the operating lever 7, a slightly long hole 7j in an arc shape is formed in a corresponding position of the long hole 3j. Further, a cam 80 is disposed between the driven side worm wheel 60 and the back-side bracket 3 on the outside. In the center of the cam 80 a through hole 81 is formed, and a flat surface 81a is formed in part of the through hole 81. This flat surface corresponds to the flat surface 6d formed in part of the outside surface of the eccentric shaft 6, and thus the flat surfaces 81a, 6d engage with each other when the eccentric shaft 6 is inserted through the through hole 81, causing the both to rotate integrally. Further, slightly above the through hole 81, a small hole 82 is provided. Then, a lock shaft 90 is disposed so that its one end portion 90a engages with the small hole 82 of the cam 80 and further penetrates through the above-described long hole 3j and hole 7j in an arc shape, and another end part 90b projects from an outer surface of the operating lever 7. With the other end part 90b of the lock shaft 90, one end of a lock spring 95 is engaged. Another end of the lock spring 95 is engaged with a middle portion 7d between the base end portion 7a and the front end portion 7b in the operating lever 7. The other structure is the same as the above-described embodiment.

According to this embodiment, when it is operated from the unlocked state to the locked state, once the retaining force by which the operating lever 7 is positioned on the upper side is released (for example, when the hand which has been operating it is released), the elastic force of the return spring 8 makes the operating lever 7 to pivot downward clockwise. When the operating lever 7 pivots downward, accompanying this, since the lock shaft 90 is coupled via the lock spring 95 as illustrated in FIG. 13(a), the cam 80 with which the one end portion 90a of the lock shaft 90 engages rotates together with the operating lever 7, and the eccentric shaft 6 engaging with the through hole 81 of the cam 80 rotates. By this rotation of the eccentric shaft 6, the driven side worm wheel 60 is pressed against the worm 50. In the gap between the driven side worm wheel 60 and the worm 50 and between the worm 50 and the main driving side worm wheel 40, plural teeth are brought to mesh one another, making the eccentric shaft 6 unable to rotate and hence locked.

Figure 15:
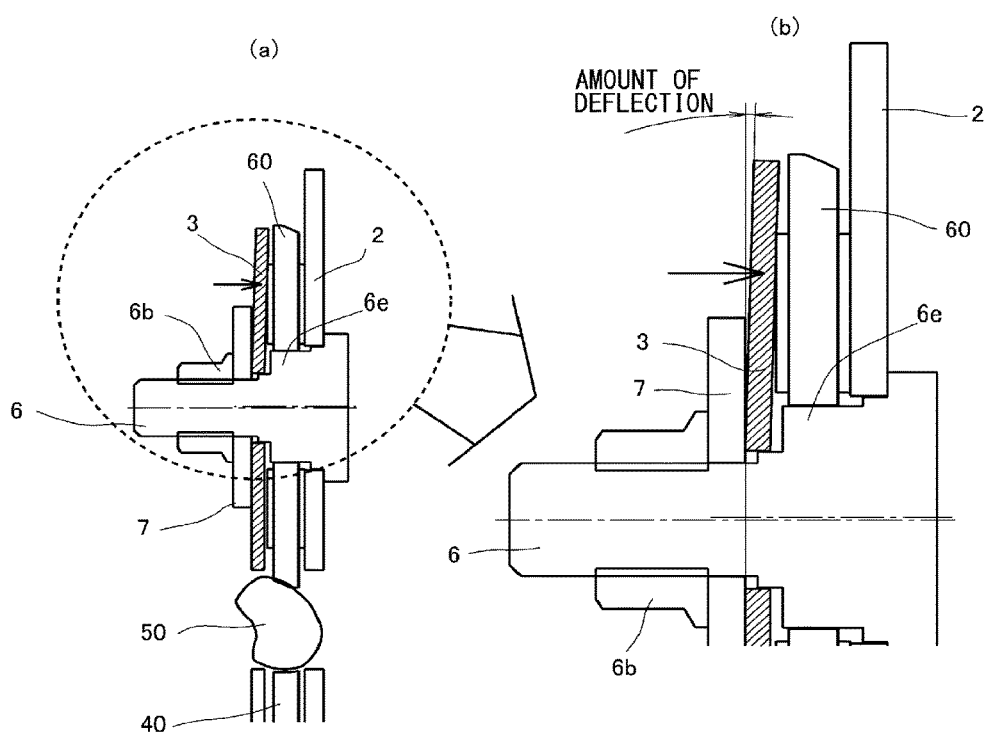
FIGS. 15(*a*), (*b*) are views for explaining operation of a braking mechanism.

In this state, when a force to further pivot the operating lever 7 downward is operated by a hand of a person or the like, since the eccentric shaft 6 is already unable to rotate in this state, a nut 6b welded on the operating lever 7 rotates together with the operating lever 7 and is displaced continuously in a direction to fasten the eccentric shaft 6. Accordingly, as illustrated in FIG. 15, a surface of the driven side worm wheel 60 is pressed by the surface of the back-side bracket 3 on the outside, braking rotation of the driven side worm wheel 60.

This embodiment is structured such that by pivoting the operating lever 7 downward, after the driven side worm wheel 60 is pressed against the worm 50, only the operating lever 7 and the nut 6b are rotated to press the back-side bracket 3 on the outside against the driven side worm wheel 60 in a direction in which the surfaces get close to each other. Therefore, gaps between the members are made small, and occurrence of rattling or abnormal sound when the seat back is locked can be reduced. In this embodiment, members including the nut 6b as this pressing member, the operating lever 7 rotating the nut 6b, and the back-side bracket 3 on the outside constitute a braking mechanism. By having such a braking mechanism, rotation of the driven side worm wheel 60 can be stopped more reliably.

When unlocked, as illustrated in FIGS. 14(a), 14(b), the operating lever 7 is pivoted upward counterclockwise. Accordingly, first, the nut 6b rotates in the direction to disengage from the eccentric shaft 6, and thus the braking force of the back-side bracket 3 on the outside to press the driven side worm wheel 60 in the direction which the surfaces get close each other is released. When the operating lever is further pivoted upward in this state, the cam 80 and the eccentric shaft 6 rotate in the reverse direction of above via the lock shaft 90. Thus, the driven side worm wheel 60 is pushed up, the gaps between the respective teeth of the driven side worm wheel 60 and the worm 50 and between the respective teeth of the worm 50 and the main driving side worm wheel 40 become an appropriate backlash to allow their respective rotation, it becomes possible to transmit a rotational force, and the back-side brackets 2, 3 rotate forward or backward about the rotation shaft 9 with respect to the cushion-side bracket 1 (see FIG. 7).

Figure 16:
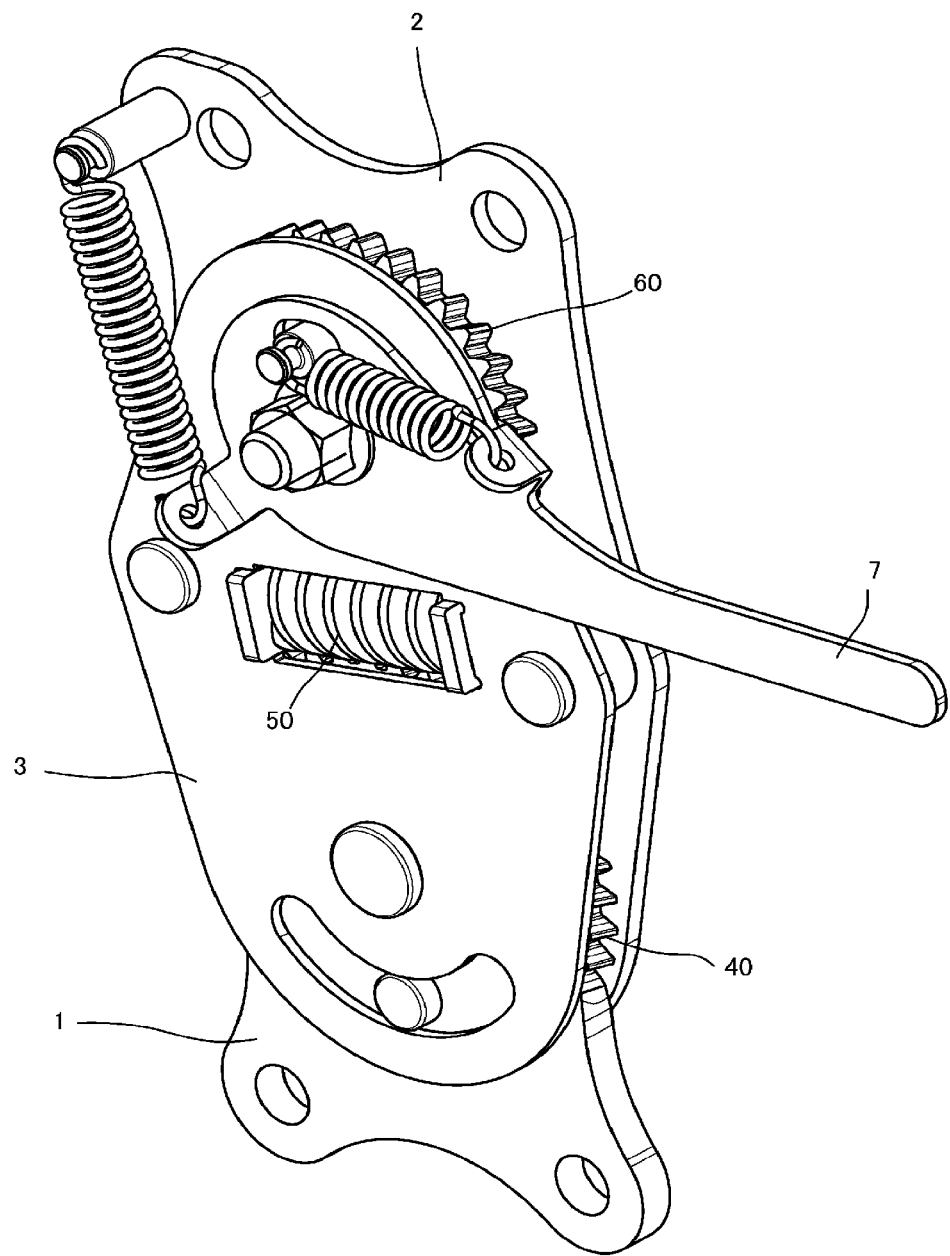
FIG. 16 is an exterior perspective view of a mode in which a main driving side worm wheel is provided integrally with a cushion-side bracket.
Figure 17:
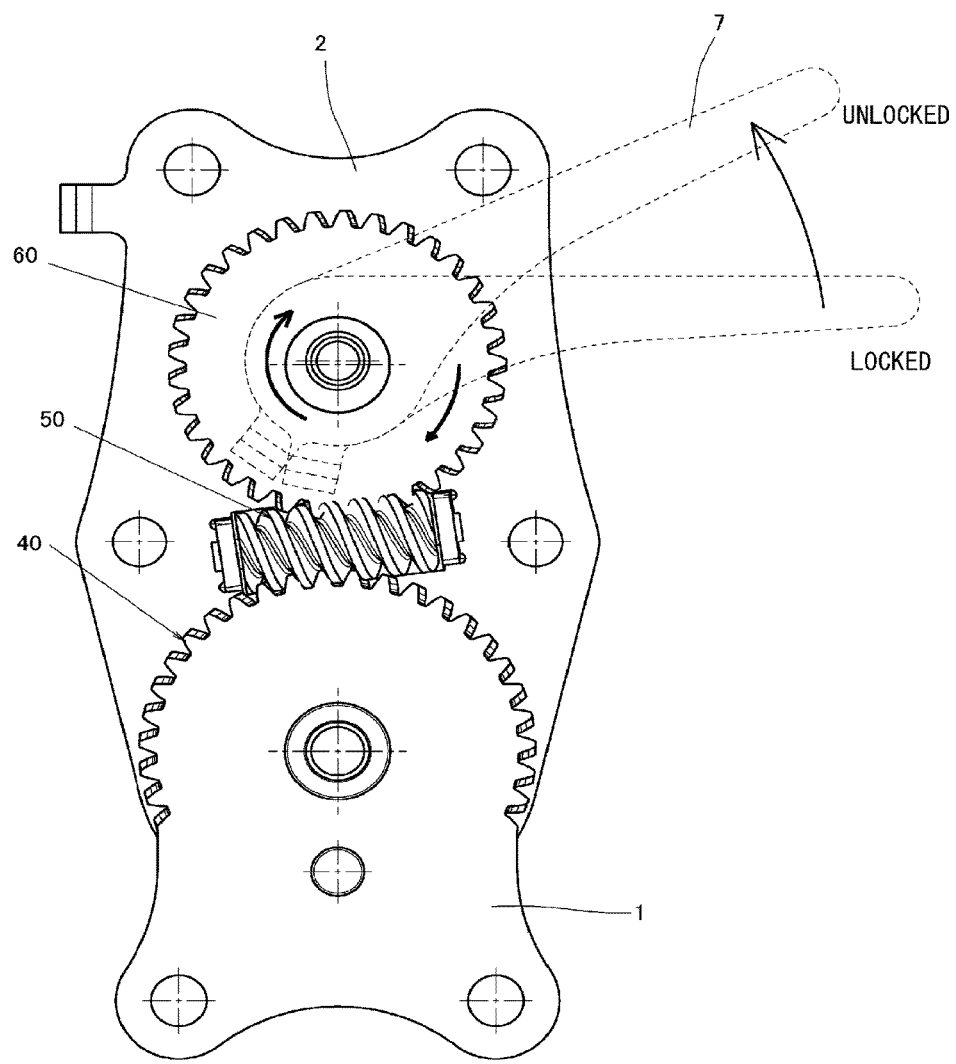
FIG. 17 is a front view illustrating a positional relation of respective gears in a mode in which the main driving side worm wheel is provided integrally with the cushion-side bracket.
Figure 18:
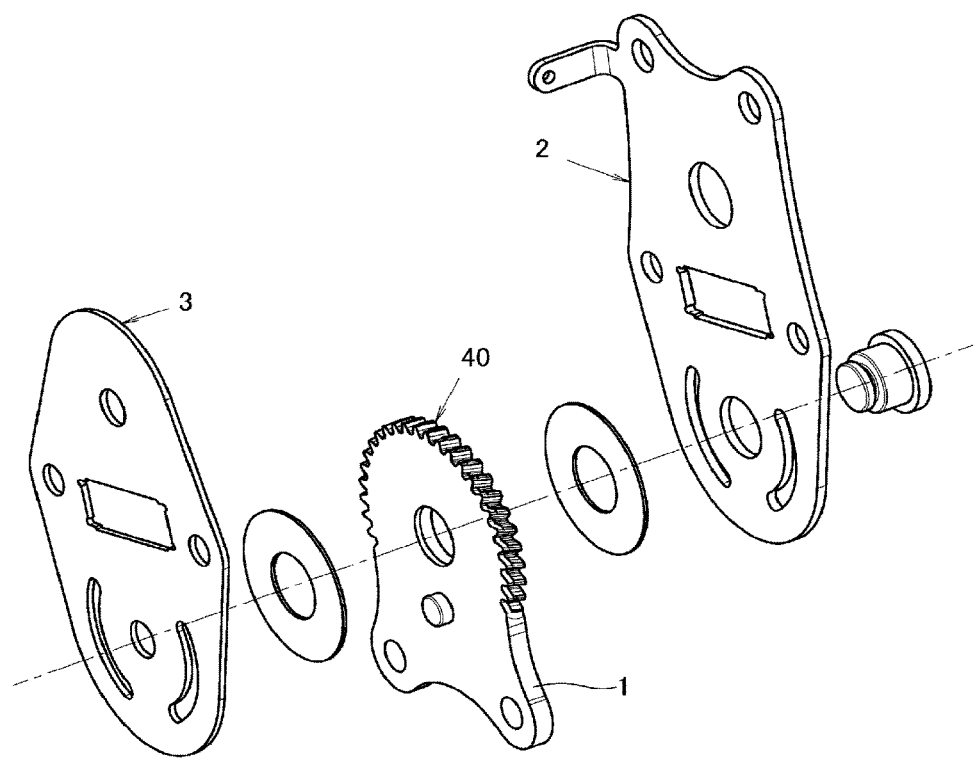
FIG. 18 is a partially exploded view of FIG. 16.

Note that although the portion of the teeth projecting from the upper part of the cushion-side bracket 1 is the use area of the main driving side worm wheel 40 is as described above, from this point, as illustrated in FIG. 16 to FIG. 18, it can be structured such that teeth are formed in an upper peripheral edge of the cushion-side bracket 1, and the main driving side worm wheel 40 is integrated with the cushion-side bracket 1. This contributes to reduction of the number of parts and reduction of manufacturing costs.

FIG. 19 to FIG. 22 are views illustrating an overall structure of a seat in which reclining adjusters 10, 10 are disposed each between a left and a right side frame (hereinafter referred to as a "back-side side frame") 210, 210 of a seat back frame 200 and a left and a right side frame (hereinafter referred to as a "cushion-side side frame") 110, 110 of a seat cushion frame 100. The structure of the reclining adjusters 10, 10 of this embodiment is basically the same as the above-described embodiments, but in this embodiment, particularly cooperation of the left and right reclining adjusters 10, 10 will be described. However, FIG. 19 to FIG. 22 illustrate a structure in which each back-side side frame 210, 210 itself of the seat back frame 200 is used instead of the back-side bracket 2 on the inside in the above-described embodiments, and this back-side side frame 210, 210 and each back-side bracket 3, 3 on the outside disposed on an outer surface of its lower portion are second members. Further, the main driving side worm wheel 40 is a sector gear structure integrally formed with the cushion-side bracket 1 which is the first member.

The other structure of the left and right reclining adjusters 10, 10 is the same as the above embodiments, but rotation transmission brackets 600, 600 are each attached to a portion projecting on an inner surface of the back-side side frame 210, 210 of an eccentric shaft 6, 6 inserted through a driven side worm wheel 60, 60 of one of the left and right reclining adjusters 10, 10. Then, a coupling shaft 610 is disposed between the rotation transmitting brackets 600, 600.

Projecting parts 601, 601 projecting inward are each provided in a peripheral edge portion of one of the rotation transmission brackets 600, 600. On the other hand, a plate-shaped end wall member 612, 612 is provided on each end portion 611, 611 of the coupling shaft 610. Specifically, each end portion 611, 611 is coupled by penetrating a portion close to one end of the end wall member 612, 612 in a thickness direction. In a portion close to another end of the end wall member 612, 612, a long hole 612a, 612a is formed by penetration. Each end portion 611, 611 of the coupling shaft 610 is inserted through a bearing hole 210a, 210a formed in one of the back-side side frames 210, 210, and the projecting part 601, 601 of each rotation transmission bracket 600, 600 is disposed to be inserted through the long hole 612a, 612a of the coupling shaft 610.

Figure 19:
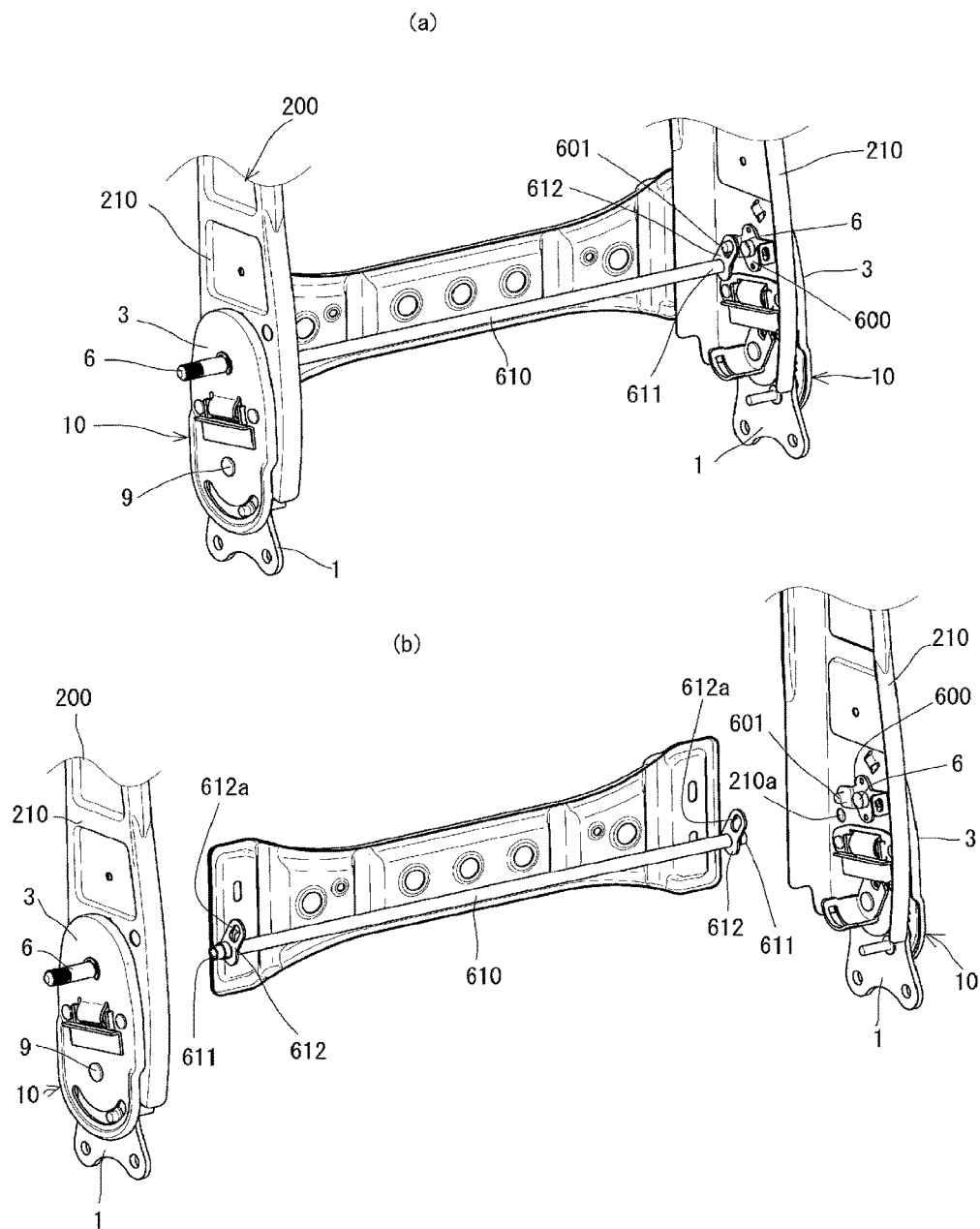
FIG. 19(*a*) is a perspective view illustrating a state that a reclining adjuster according to another embodiment of the present invention is attached to each of left and right sides of a seat back frame, and FIG. 19(*b*) is a partially exploded view thereof.
Figure 23:
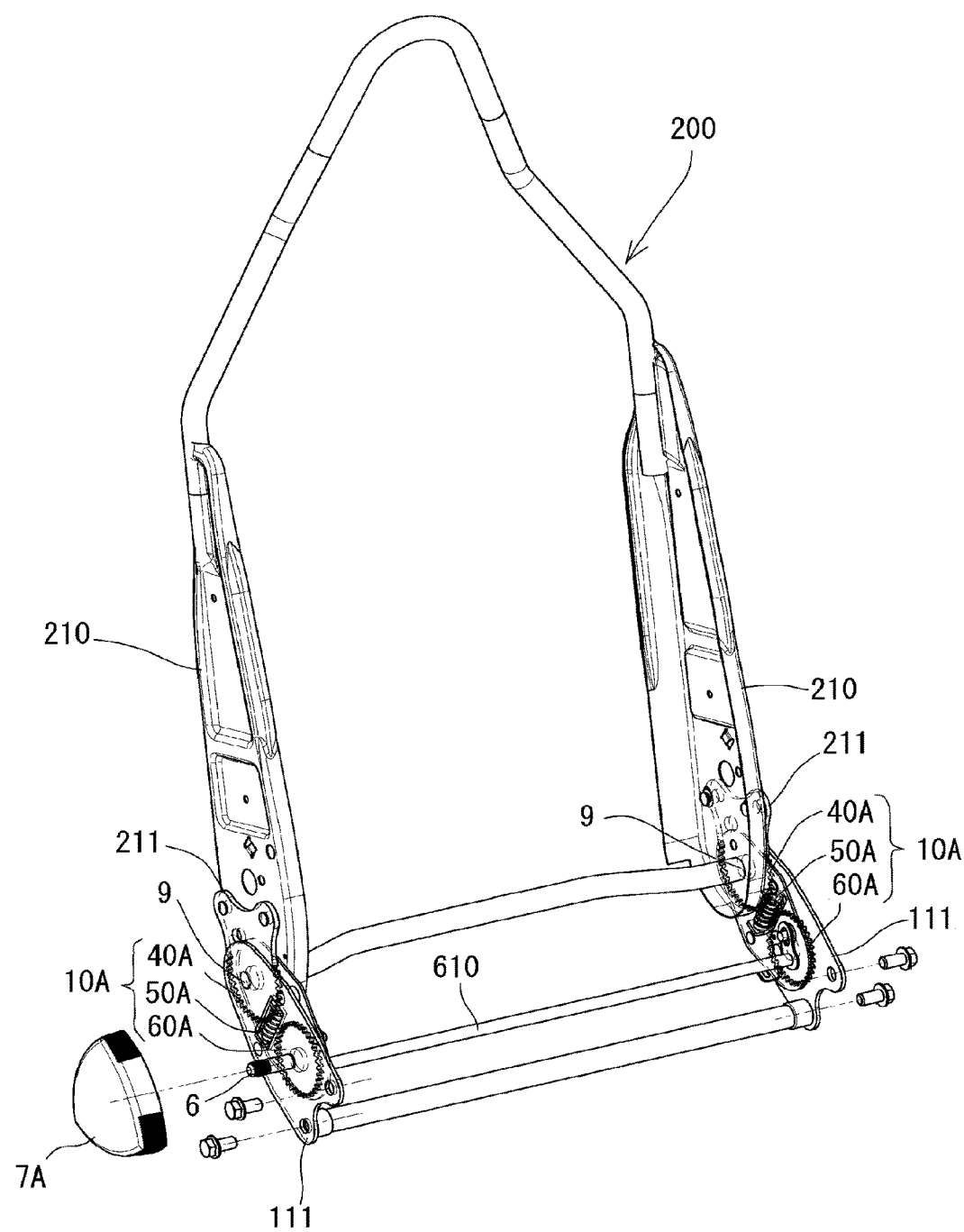
FIG. 23 is a view for explaining a reclining adjuster according to still another embodiment of the present invention.
Figure 24:
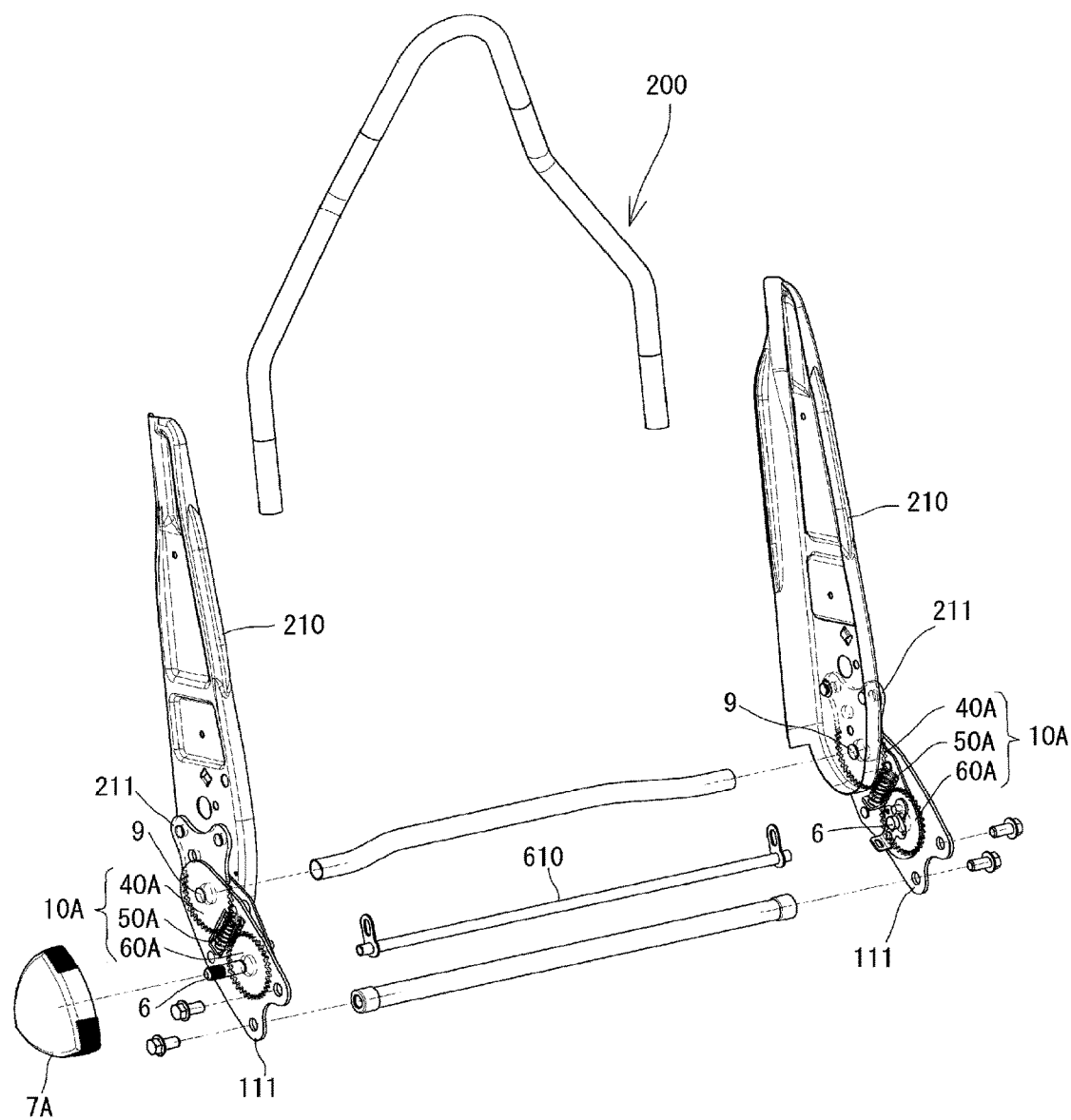
FIG. 24 is an exploded perspective view of FIG. 23.

Further, in a portion projecting outward of the back-side bracket 3 on the outside of one eccentric shaft 6 (projecting portion of the eccentric shaft 6 on the left side of FIG. 19), a not-illustrated operating member (the operating lever 7 illustrated in the above-described embodiment or an operating dial 7A illustrated in FIG. 23, which will be described later) is attached.

According to this embodiment, when rotated in the lock direction by operation of a return spring (not illustrated) or electric driving, one eccentric shaft 6 to which the operating member is attached rotates in the same direction. When the one eccentric shaft 6 rotates, one rotation transmission bracket 600 attached to this eccentric shaft 6 rotates in the same direction. When the one rotation transmission bracket 600 rotates, its projecting part 601 pushes an inside wall of the long hole 612*a* of one end wall member 612 in the rotation direction, and the coupling shaft 610 rotates about one end portion 611 inserted through the bearing hole 210*a*. Thus, the other end wall member 612 rotates synchronously in the same direction, and moreover, the other eccentric shaft 6 rotates synchronously via the other long hole 612*a*, projecting part 601, and rotation transmission bracket 600.

Therefore, the two, left and right eccentric shafts 6, 6 rotate synchronously, and accompanying this, the two driven side worm wheels 60, 60 rotate synchronously in the same direction and are each pressed in the direction of the worms 50, 50 similarly to the above embodiments. Moreover, the worms 50, 50 are pressed against the main driving side worm wheels 40, 40, the gaps between the respective teeth become small, and the respective three gears 40, 50, 60 on the left and right become mutually non-rotatable and locked at their positions.

When the operating member is rotated in the reverse direction of the above direction by a manual operation or electric driving, the two, left and right driven side worm wheels 60, 60 rotate synchronously in the reverse direction of the above direction, enabling to adjust inclination of the back frame 200 forward or backward about the rotation shaft 9. The gaps between the respective teeth of the driven side worm wheels 60, 60 and the worms 50, 50 and between the respective teeth of the worms 50, 50 and the main driving side worm wheels 40, 40 become an appropriate backlash to allow their respective rotation, and it becomes possible to transmit a rotational force, enabling to adjust inclination of the back frame 200 forward or backward about the rotation shaft 9 as described in the above embodiments.

Figure 20:
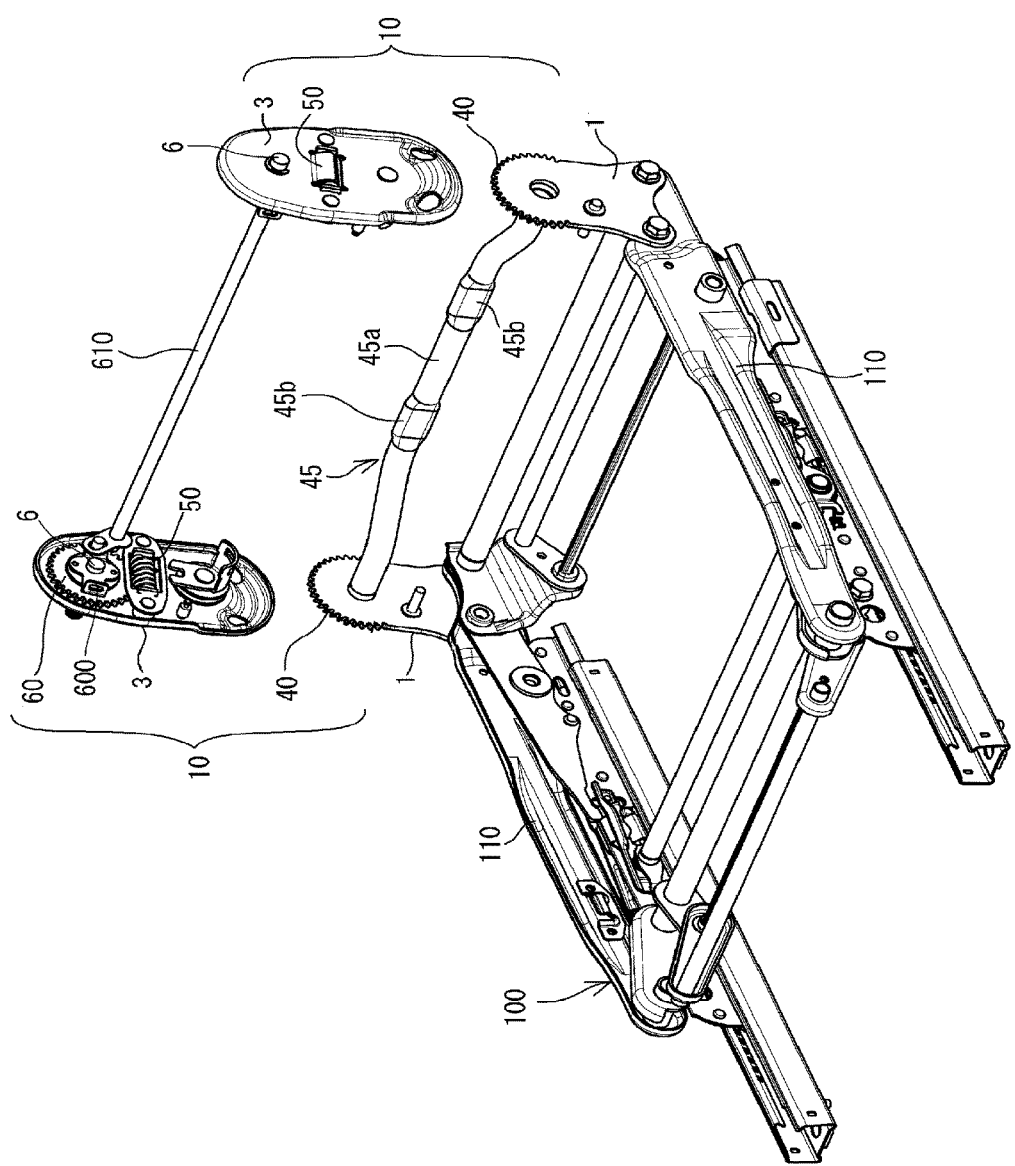
FIG. 20 is a perspective view illustrating an arrangement relation of the reclining adjusters illustrated in FIG. 19 and a seat cushion frame.
Figure 21:
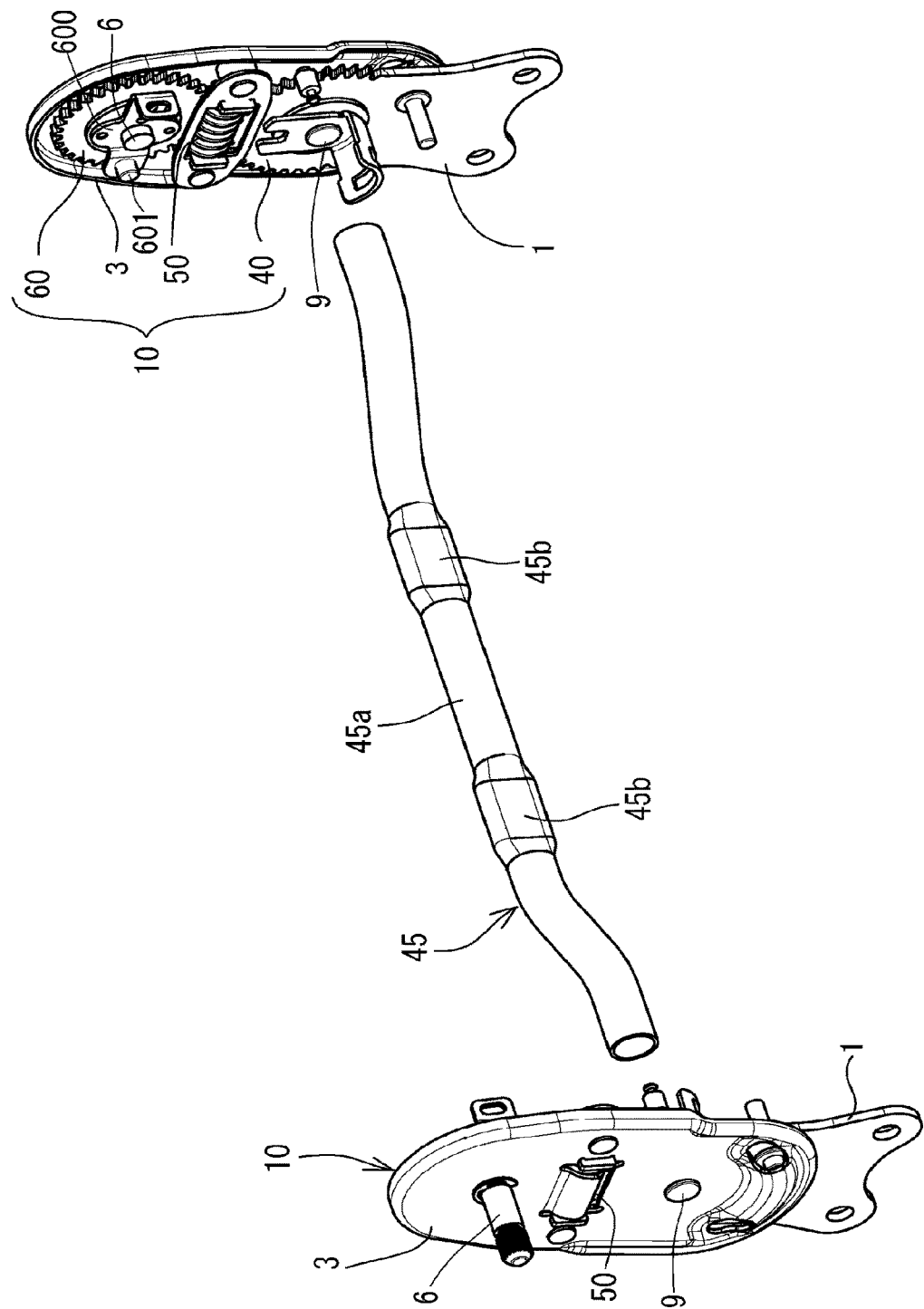
FIG. 21 is a perspective view illustrating an arrangement relation of the reclining adjusters illustrated in FIG. 19 and a reinforcing bridging member.
Figure 22:
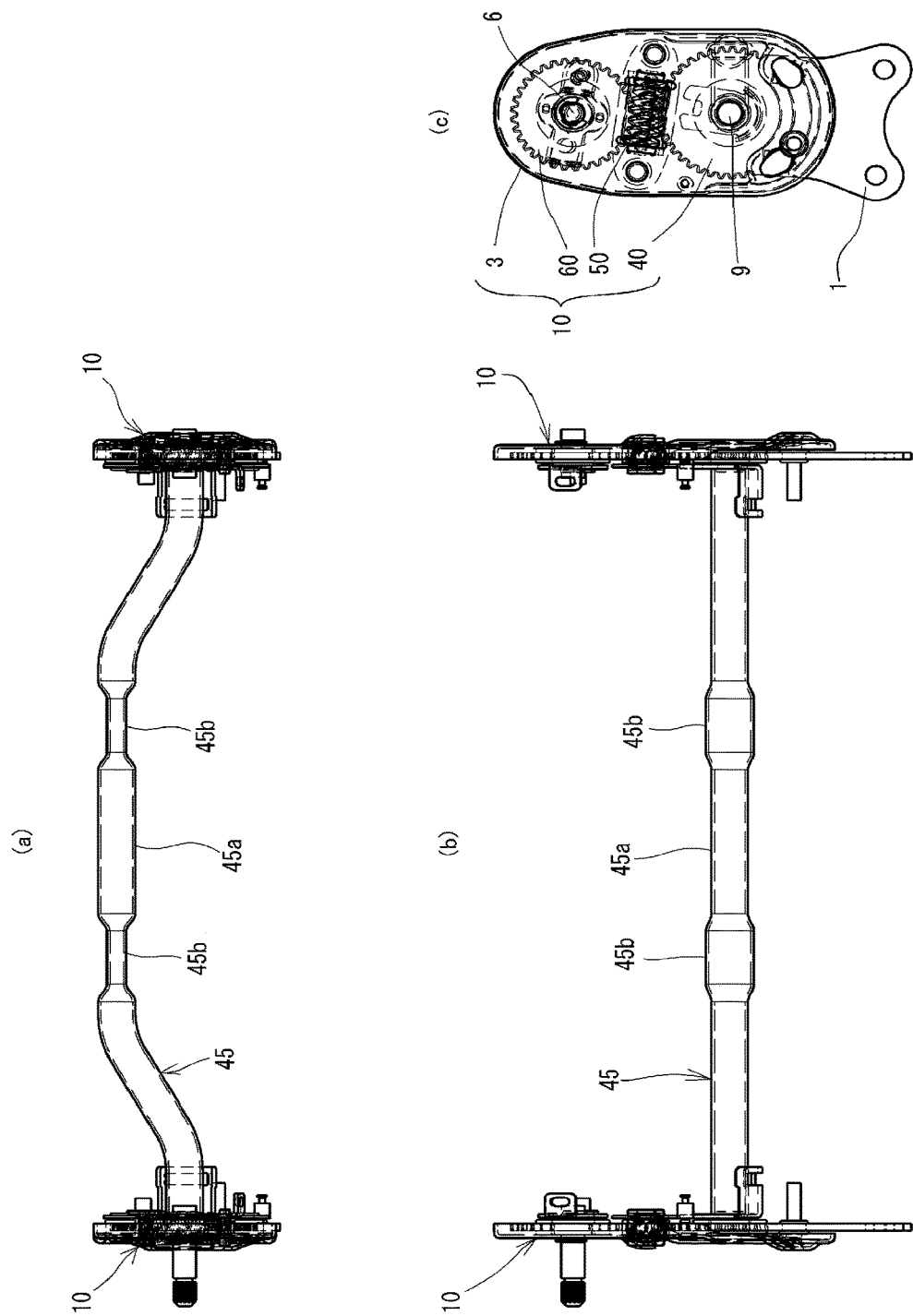
FIG. 22(*a*) is a plan view of FIG. 21, FIG. 22(*b*) is a front view of FIG. 21, and FIG. 22(*c*) is a side view of FIG. 21.

In addition, according to this embodiment, cushion-side brackets 1, 1 disposed on the left and right are structured to be integrally provided with the main driving side worm wheels 40, 40, and are formed from a material for manufacturing gears constituted of steel material and basically have high strength. Utilizing this point, as illustrated in FIG. 20 to FIG. 22, it is preferred to bridge a reinforcing bridging member 45 therebetween. This can improve rearward moment strength upon reception of an impact of a rear collision, or the like. In this case, upon reception of an impact of a rear collision, or the like, the human body moves rearward. In order to avoid blocking of rearward movement of the human body by the reinforcing bridging member 45 at this time, it is preferred to form a rearward projecting part 45*a* by bending the vicinity of a substantially center of the reinforcing bridging member 45 rearward in advance to make a shape easily accepting a human body, and it is more preferred to provide easy deformation portions 45*b*, 45*b* which will be a trigger (origin) to generate a deformation of the rearward projecting part 45*a* to be displaced further rearward upon further application of a rearward load. In addition, the easy deformation portions 45*b*, 45*b* can be formed by, for example, a process to make a section modulus partially small by crushing so that the diameter is thinner than other portions, cutting out only the relevant part in a semi-tubular shape, or the like.

FIG. 23 to FIG. 26 are views illustrating reclining adjusters 10A, 10A as a rotating movement control mechanism according to still another embodiment of the present invention. The reclining adjusters 10A, 10A of this embodiment are structured such that the main driving side worm wheels 40A, 40A are provided on the side of a back frame 200 which is a second member, and driven side worm wheels 60A, 60A and worms 50A, 50A are provided on cushion-side brackets 111, 111 on the side of a cushion frame 100 which is a first member.

Specifically, back-side brackets 211, 211 respectively attached to back-side side frames 210, 210 of the back frame 200 are formed using steel material suitable for manufacturing gears, and main driving side worm wheels 40A, 40A are respectively formed integrally on the back-side brackets 211, 211. Then, the back-side brackets 211, 211 are fixed to lower portions of the back-side side frames 210, 210 so that the teeth of the main driving side worm wheels 40A, 40A face down. To the back-side brackets 211, 211 and the back-side side frames 210, 210, rotation shafts 9, 9 are provided on the left and right, and the back frame 200 including the back-side brackets 211, 211 and the back-side side frames 210, 210 inclines forward or backward about rotation shafts 9, 9 located in the vicinity of the lower portions of the back-side side frames 210, 210, similarly to the above embodiments.

On each of the cushion-side brackets 111, 111, a driven side worm wheel 60A, 60A is provided rotatably, and a worm 50A, 50A is provided rotatably to an upper side (obliquely upper side in FIG. 23 and FIG. 24) of the driven side worm wheel 60A, 60A. To the eccentric shaft 6 supporting one driven side worm wheel 60A, an operating dial 7A as an operating member is coupled, and moreover, the left and right driven side worm wheels 60A, 60A are structured to rotate synchronously with each other by a coupling shaft 610 provided with a structure similar to the above embodiment.

Therefore, when the seat back frame 200 is to be locked at a predetermined angle, the operating dial 7A is rotated in the lock direction by operation of a return spring (not illustrated) or electric driving, two, left and right eccentric shafts 6, 6 rotate synchronously via the coupling shaft 610. Accompanying this, the two driven side worm wheels 60A, 60A rotate synchronously in the same direction and are each pressed in the direction of the worms 50A, 50A similarly to the above embodiment. Moreover, the worms 50A, 50A are pressed against the main driving side worm wheels 40A, 40A, the gaps between the respective teeth become small, and the respective three gears 40A, 50A, 60A on the left and right become mutually non-rotatable and locked at their positions.

When the operating dial 7A is rotated in an unlocking direction reverse to the above direction by a manual operation or electric driving, the coupling shaft 610 rotates in the unlocking direction, the two, left and right driven side worm wheels 60A, 60A rotate synchronously in the unlocking direction and become unlocked, enabling to adjust the back frame 200 forward or backward about the rotation shaft 9.

Figure 25:
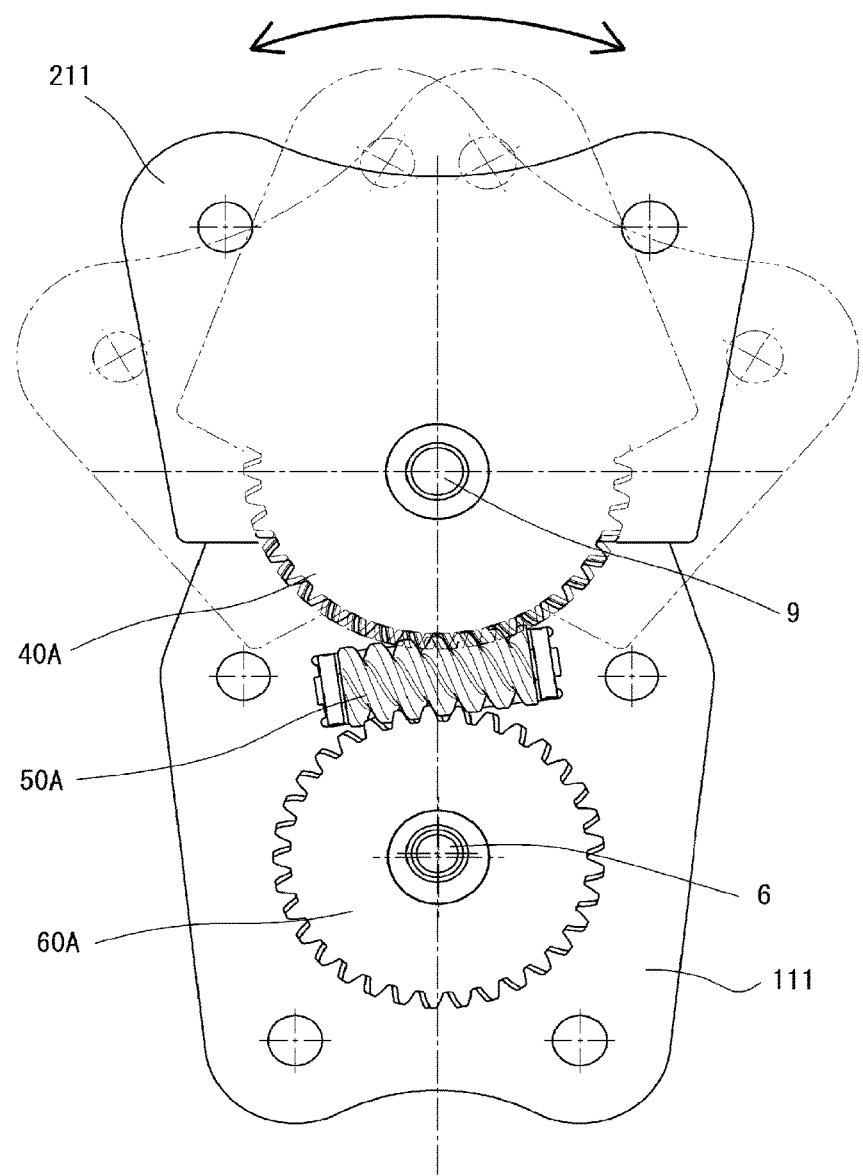
FIG. 25 is a view for explaining operation of the reclining adjuster illustrated in FIG. 23.
Figure 26:
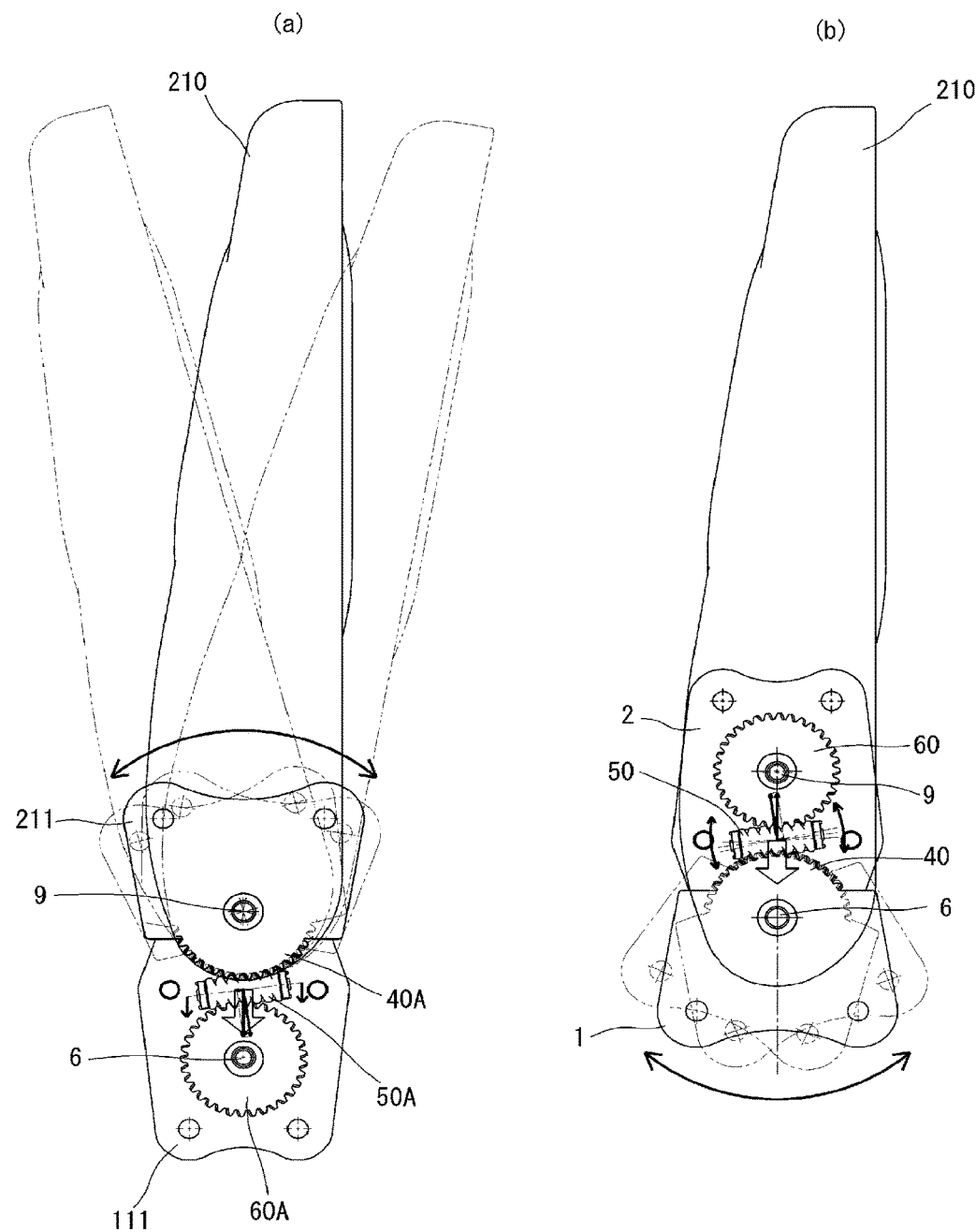
FIG. 26(*a*) is a view for explaining operation of the reclining adjuster illustrated in FIG. 23, and FIG. 26(*b*) is a view illustrating operation of the reclining adjuster employed in FIG. 1 to FIG. 22 by comparing with FIG. 26(*a*).

In this embodiment, as illustrated in FIG. 25 and FIG. 26(*a*), the main driving side worm wheel 40A, 40A are respectively provided on the back-side brackets 211, 211, and the worm 50A, 50A and the driven side worm wheel 60A, 60A are both provided on each of the cushion-side brackets 111, 111. Thus, the main driving side worm wheels 40A, 40A rotate forward or backward about the rotation shaft 9 together with the back-side side frames 210, 210 on upper sides of the worms 50A, 50A. When the main driving side worm wheels 40A, 40A rotate in this manner, the worms 50A, 50A with teeth meshing with the main driving side worm wheels 40A, 40A rotate, and moreover, the driven side worm wheels 60A, 60A meshing with the worms 50A, 50A are rotated about the eccentric shafts 6, 6.

This embodiment is structured such that, as described above, the main driving side worm wheels 40A, 40A rotating the worms 50A, 50A are disposed on upper sides of the worms 50A, 50A, and as illustrated in FIG. 26(a), the force to rotate the worms 50A, 50A by the main driving side worm wheels 40A, 40A works in a gravitation direction of the worms 50A, 50A. Specifically, by the gravity of the worms 50A, 50A, the backlash between the main driving side worm wheels 40A, 40A and the worms 50A, 50A constantly attempts to widen, and thus the friction angle needed for rotating the worms 50A, 50A by rotation of the main driving side worm wheels 40A, 40A can be made small as compared with the type in which the main driving side worm wheels 40, 40 are disposed on the lower side of the worms 50, 50 as described in FIG. 1 to FIG. 22.

FIG. 26(b) illustrates a relative movement of the main driving side worm wheel 40 in the type in which the main driving side worm wheel 40 is provided on the lower side of the worm 50 illustrated in FIG. 1 to FIG. 22. Specifically, for easiness of comparison with FIG. 26(a), FIG. 26(b) is a view illustrating that the back-side side frame 210 is fixed and the cushion-side bracket 1 on which the main driving side worm wheel 40 is formed is relatively inclined forward or backward as depicted with two-dot chain lines. In FIG. 26(b), it is necessary to allow operation of the force to rotate the worm 50 by the main driving side worm wheel 40 against the gravity of the worm 50, and thus the friction angle needs to be taken larger than in the case of FIG. 26(a). The structures of FIG. 1 to FIG. 22 and FIG. 26(b) are of course suitable, as compared with conventional structures, for suppressing whirling vibrations such that end portions in the axial direction of the worm 50 flutter up and down, which is as described above. However, with the structures of FIG. 23 to FIG. 25 and FIG. 26(a), the whirling vibrations of the worm 50A can be suppressed further.

Note that in the embodiment illustrated in FIG. 23 to FIG. 25 and FIG. 26(a), although the friction angle can be made small when compared with the structure of FIG. 1 to FIG. 22 and FIG. 26(b) as described above, driving torque thereof increases when the friction angle is made small, and thus it is suitable for use as an electrically-driven rotating movement control mechanism with a large driving force to rotate with a motor rather than a manual type. The type in FIG. 1 to FIG. 22 and FIG. 26(b) is suitable for use as a rotating movement control mechanism of manual type.

Further, in the above description, although most explanations are assuming the manual type provided with the operating member (operating lever 7 or operating handle 7A), the present invention is of course applicable to an electrically driven type in all embodiments including embodiments which are not particularly mentioned. When used for an electrically-driven rotating movement control mechanism (for example, a power reclining mechanism), for example, it is possible to couple the rotation axis of the back frame to the shaft of the motor. In addition, it may be structured to transmit the rotational force of the motor in the case of the power mechanism to the worm. In either case, any mode is included in the present invention as long as the rotational force by relative rotation of the main driving side worm wheel and the worm is transmitted to the driven side worm wheel, this force is regenerated in the worm, and whirling vibrations of the worm can be suppressed.

Further, the above-described embodiment is structured such that the first member (seat cushion side including the cushion frame) and the second member (seat back side including the back frame) operate to rotate relatively. However, it can be used as the rotating movement control mechanism of the present invention in one in which the positional relation between the first member and the second member is constantly fixed, for example, a seat in which the back frame is fixed at a predetermined angle to the cushion frame.

In this case, it is unnecessary to adjust the inclination angle of the back frame, and thus a manual member, such as an operating member or an operating dial, a motor, or the like is not necessary. In such a structure, the reclining operation is not performed at a time of normal seating. However, when a shock of a predetermined value or higher is inputted due to a collision or the like, the human body is pressed against the seat back side, and the back frame relatively inclines with respect to the cushion frame, the cushion frame inclines while the three gears of the main driving side worm wheel, the worm, and the driven side worm wheel are forced to rotate relatively. Therefore, the rotating movement control mechanisms provided on the left and right function as a mechanical damper constituted of a combination structure of the three gears each on the left and right, and an acceleration due to impact is alleviated efficiently, which can contribute to improvement of the Head Injury Criterion (HIC), and the like.

Note that also in the seat in which the first member (seat cushion side including the cushion frame) and the second member (seat back side including the back frame) operate to rotate relatively as described in the above embodiments, the combination structure of the three gears of the present invention of course functions as a mechanical damper when an impact of a predetermined value or higher is inputted.

Further, the rotating movement control mechanisms of the present invention are typically used as a reclining adjuster of a seat as described in the above embodiments, but can also be used as a rotation operating unit of a front-rear lifter or a parallel lifter, or further as a substitute for a lock mechanism of a power unit motor or the like. Further, it is not limited to a vehicle seat for an automobile or the like, but can also be applied to a seat of a train, an aircraft, or the like.

EXPLANATION OF REFERENCE SYMBOLS 1 cushion-side bracket
2 back-side bracket on inside
3 back-side bracket on outside
6 eccentric shaft
6b nut
7 operating lever
8 return spring
9 rotation shaft
10, 10A reclining adjuster
40, 40A main driving side worm wheel
50, 50A worm
60, 60A driven side worm wheel
80 cam
90 lock shaft
95 lock spring

The invention claimed is:
1. A rotating movement control mechanism comprising:
a first member attached to a frame of a seat cushion, and a second member retained at a rotation angle with respect to a first member, wherein the second member is attached to a frame of a seat back, the first member and the second member being used as a reclining adjuster to adjust an inclination angle of the seat back with respect to the seat cushion;

a worm provided on one of the first and second members, the worm being axially supported between bearing parts disposed on both end portions in an axial direction of the worm; and a main driving side worm wheel provided on one of the first and second members across the worm and a driven side worm wheel axially supported rotatably on the other of the first and second members, wherein:

the worm is structured to be supported between and meshing with the main driving side worm wheel and the driven side worm wheel;

the driven side worm wheel and the worm are each pivotable in a same rotational direction about one of the first member and second member and about the main driving side worm wheel upon rotation of the worm; and the rotating movement control mechanism is structured such that the driven side worm wheel is rotated by a rotational force which rotates the worm with respect to the main driving side worm wheel, and a rotational force of the driven side worm wheel is regenerated in the worm.

2. The rotating movement control mechanism according to claim 1, structured such that when the driven side worm wheel operates in a direction to be pressed against the worm, a backlash between the driven side worm wheel and the worm decreases to enable locking in a stepless position.

3. The rotating movement control mechanism according to claim 1, structured such that at least one of the first and second members is provided to be capable of undergoing a deformation by receiving an impact force of a predetermined value or higher, the main driving side worm wheel is pressed against the worm by the deformation and a backlash between the main driving side worm wheel and the worm in a stepless position can be reduced.

4. The rotating movement control mechanism according to claim 1, structured such that:

the driven side worm wheel is supported rotatably via an eccentric shaft whose rotation center is a position eccentric from a center position of the driven side worm wheel; and when the eccentric shaft is rotated at a time of locking, the driven side worm wheel is pressed against the worm, and thereby a backlash between the driven side worm wheel and the worm is decreased, so as to limit transmission of a rotational force.

5. The rotating movement control mechanism according to claim 1, further comprising a brake mechanism including a member to be pressed toward a surface of the driven side worm wheel and a press member pressing the member to be pressed toward the surface of the driven side worm wheel, the member to be pressed and the press member being provided on the one of the first member or the second member to which the driven side worm wheel is axially supported, wherein when transmission of a rotational force is limited, the member to be pressed is pressed by the press member, and thereby rotation of the driven side worm wheel is braked.

6. The rotating movement control mechanism according to claim 5, structured such that the first member or the second member to be pressed is the one of the members itself on which the driven side worm wheel is axially supported, the press member is constituted of a nut screwed on the eccentric shaft to rotate on an opposite side of the driven side worm wheel across the one of the first member or the second member, and when transmission of the rotational force is limited, the one of the first member or the second member is pressed in a direction of the driven side worm wheel by rotating the nut in a fastening direction.

7. The rotating movement control mechanism according to claim 1, wherein the driven side worm wheel is structured to be larger in mass than the worm, and a force corresponding to the mass of the driven side worm wheel works on the worm, to thereby suppress vibrations of the worm.

8. The rotating movement control mechanism according to claim 1, wherein by the worm provided being displaceable in a direction substantially orthogonal to an axial center, the worm, the driven side worm wheel, and the main driving side worm wheel are structured such that when respective teeth thereof mesh to operate, one tooth enters other teeth in a wedge-like manner, and pluralities of teeth thus mesh with each other.

9. The rotating movement control mechanism according to claim 1, wherein the first member and the second member are two rotating members rotating relatively with respect to each other among a plurality of members constituting a seat, and are used as members for the seat.

10. A seat comprising the seat cushion and the seat back, wherein the rotating movement control mechanism according to claim 1 is provided between two rotating members among a plurality of members constituting the seat.

11. The seat according to claim 10, wherein the rotating movement control mechanism is provided between one of members constituting a frame of the seat cushion and one of members constituting a frame of the seat back.

12. The seat according to claim 11, wherein the rotating movement control mechanism is provided as a reclining adjuster.

* * * * *